(12) United States Patent
Yamagishi

(10) Patent No.: US 8,047,610 B2
(45) Date of Patent: Nov. 1, 2011

(54) VEHICLE SEATS

(75) Inventor: Atsuhiro Yamagishi, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 298 days.

(21) Appl. No.: 12/341,047

(22) Filed: Dec. 22, 2008

(65) Prior Publication Data

US 2009/0167068 A1 Jul. 2, 2009

(30) Foreign Application Priority Data

Dec. 26, 2007 (JP) ................................. 2007-334576

(51) Int. Cl.
*A47C 1/00* (2006.01)
(52) U.S. Cl. .................... 297/341; 297/322; 297/334
(58) Field of Classification Search .................. 297/321, 297/322, 378.12, 334, 341
See application file for complete search history.

(56) References Cited

U.S. PATENT DOCUMENTS

| | | | | |
|---|---|---|---|---|
| 3,941,417 | A * | 3/1976 | Re ............................... | 297/85 R |
| 6,152,533 | A | 11/2000 | Smuk | |
| 6,199,951 | B1 * | 3/2001 | Zeile et al. ..................... | 297/341 |
| 6,565,112 | B2 * | 5/2003 | Hanson et al. ................. | 280/650 |
| 7,090,188 | B2 * | 8/2006 | Severini et al. ............... | 248/424 |
| 7,156,463 | B2 * | 1/2007 | Taubmann et al. ...... | 297/378.12 |
| 7,651,166 | B2 * | 1/2010 | Schwingenschlogel et al. ........................ | 297/378.12 |
| 2004/0262969 | A1 * | 12/2004 | Sasaki et al. ............. | 297/344.11 |
| 2007/0018492 | A1 * | 1/2007 | Becker et al. ............ | 297/378.12 |
| 2007/0090674 | A1 * | 4/2007 | Miyauchi et al. ........ | 297/378.12 |
| 2008/0252123 | A1 | 10/2008 | Kuno et al. | |
| 2008/0284197 | A1 | 11/2008 | Fukuda et al. | |
| 2009/0167046 | A1 * | 7/2009 | Yamagishi ................. | 296/65.08 |

FOREIGN PATENT DOCUMENTS

| | | |
|---|---|---|
| DE | 10055205 | 6/2002 |
| DE | 102006007139 | 8/2007 |
| DE | 102006022800 | 11/2007 |
| JP | 2006-142938 | 6/2006 |

OTHER PUBLICATIONS

English language Abstract of JP 2006-142938, Jun. 8, 2006.
U.S. Appl. No. 12/341,258 to Yamagishi, filed Dec. 22, 2008.

* cited by examiner

*Primary Examiner* — Peter Brown
*Assistant Examiner* — David E Allred
(74) *Attorney, Agent, or Firm* — Greenblum & Bernstein, P.L.C.

(57) ABSTRACT

A vehicle seat that includes a support base, a seat back tiltably supported on the support base, a seat cushion, a first link and a second link. Each of the first and second links is pivotally coupled to the support base and the seat cushion, so that a multi-link mechanism is formed by the support base, the seat cushion, the first link and the second link. A coupling device couples the seat back to the first link, so that the first link can pivot relative to the support base and the seat cushion in response to the tilting movement of the seat back. The tilting movement of the seat back causes the seat cushion to shift toward the support base, while a coupling point between the first link and the seat cushion and a coupling point between the second link and the seat cushion move substantially in the same direction relative to the support base.

10 Claims, 15 Drawing Sheets

VEHICLE SEATS

This application claims priority to Japanese patent application serial number 2007-334576, the contents of which are incorporated herein by reference.

BACKGROUND OF THE INVENTION

Field of the Invention

The present invention relates vehicle seats, in particular to vehicle seats that have a seat back capable of forwardly tilting from a position usable as a backrest to take a forwardly tilted position.

Vehicle seats are known that have a walk-in function enabling a seat back to be tilted forwardly and then enabling the entire seat to slide forwardly with respect to a traveling direction of a vehicle, so that a space on the rear side of the seat can be broadened for passengers who get on an off the vehicle. U.S. Pat. No. 6,152,533 discloses a vehicle seat that has a tilt-down function in addition to a walk-in function. The tilt-down function enables the seat to be folded to have a compact size.

In the above U.S. patent, a seat back and a seat cushion are connected to and supported by a support base disposed on a vehicle floor. The tilt-down function enables the seat cushion to shift downward as the seat back tilts forwardly. With this arrangement, the seat back can be tilted forwardly toward the upper surface of the downwardly shifted seat cushion, so that the entire seat can be folded and positioned at a lower level.

However, according the above U.S. patent, for realizing the walk-in function, the rear portion of the seat cushion is lifted as the seat back tilts forwardly. Therefore, the lower portion of the seat back and the rear portion of the seat cushion interfere with each other as the seat back tilts forwardly. As a result, a possibility may exist that signs of interference are left at the interfering portions of the seat back and the seat cushion.

Therefore, there has been a need for a vehicle seat that can prevent or minimize interference between a seat back and a seat cushion when the seat back tilts toward the seat cushion.

SUMMARY OF THE INVENTION

One aspect according to the present invention includes a vehicle seat that includes a support base, a seat back tiltably supported on the support base, a seat cushion, a first link and a second link. Each of the first and second links is pivotally coupled to the support base and the seat cushion, so that a multi-link mechanism is formed by the support base, the seat cushion, the first link and the second link. A coupling device couples the seat back to the first link, so that the first link can pivot relative to the support base and the seat cushion in response to the tilting movement of the seat back. The tilting movement of the seat back causes the seat cushion to shift toward the support base, while a coupling point between the first link and the seat cushion and a coupling point between the second link and the seat cushion move substantially in the same direction relative to the support base.

DETAILED DESCRIPTION OF THE INVENTION

Figure 1:
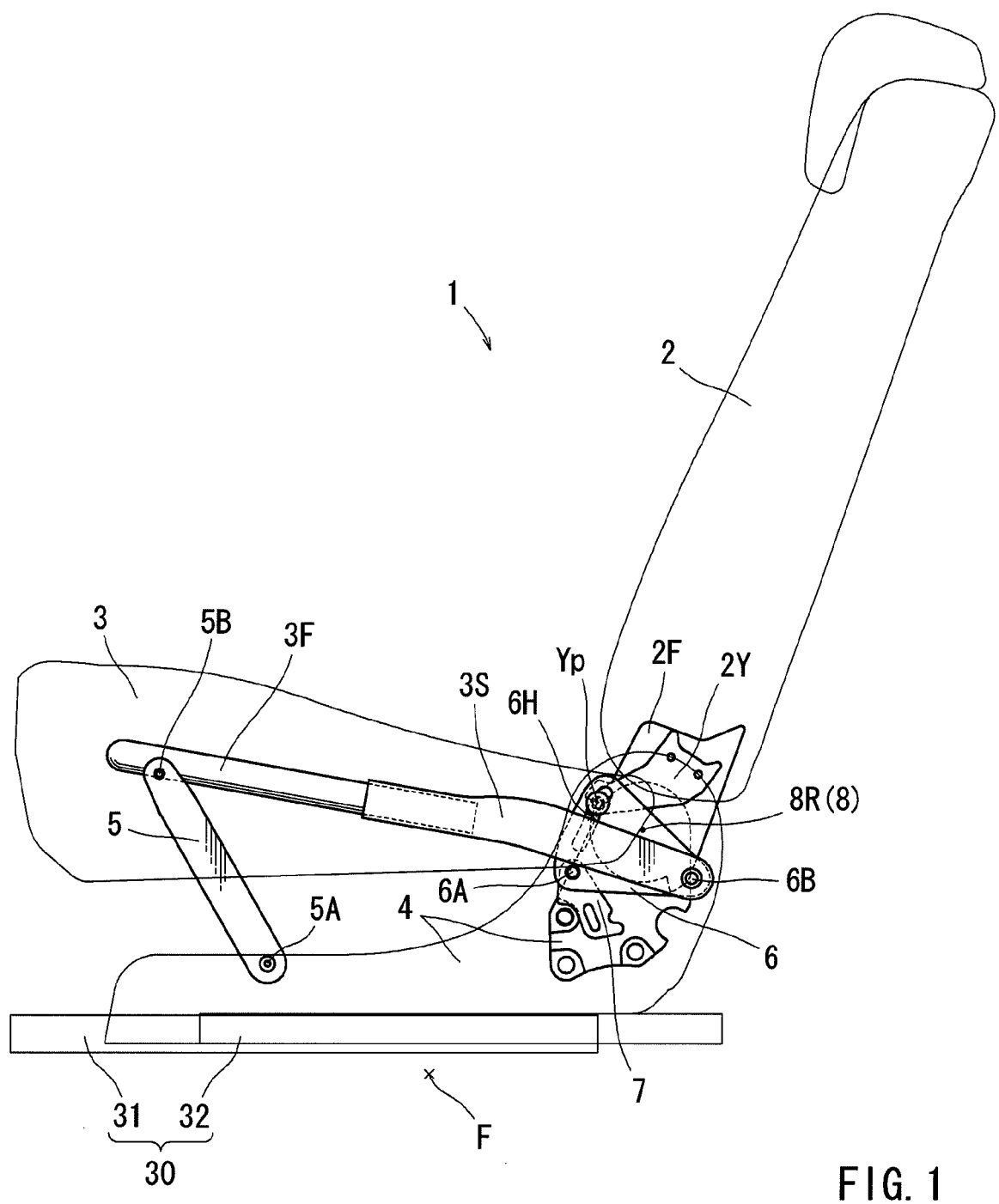
FIG. 1 is a schematic side view of a vehicle seat according to an embodiment of the present invention.

Each of the additional features and teachings disclosed above and below may be utilized separately or in conjunction with other features and teachings to provide improved vehicle seats. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

In one embodiment, a vehicle seat includes a seat back, a seat cushion and a support base supporting the seat back on a vehicle floor. A front link couples the support base and the seat cushion to each other and pivotally couples to each of the support base and the seat cushion. A rear link couples the seat cushion and the support base to each other and pivotally couples to each of the seat cushion and the support base. The seat back is coupled to the support base, so that the seat back can tilt forwardly relative to the support base. A first coupling point of the rear link to the seat cushion is positioned rearward of a second coupling point of the front link to the seat cushion. A force transmission device transmits a force caused by the tilting movement of the seat back to the rear link when the seat back is tilted forwardly. The first coupling point is positioned rearward of a third coupling point of the rear link to the support base, so that the rear link pivots to cause a downwardly shifting movement of the seat cushion as the force is transmitted from the forwardly tilting seat back to the rear link via the force transmission device. With this arrangement, it is possible to prevent or minimize potential interaction between the seat back and the seat cushion during the forwardly tilting movement of the seat back.

In another embodiment, the rear link pivots relative to the support base in a direction opposite to the tilting direction of the seat back when the seat back is tilted forwardly. On the other hand, the front link pivots relative to the support base in the same direction as the tilting direction of the seat back by receiving the pivoting movement of the rear link. With this arrangement, as the seat back tilts forwardly, the rear link pivots in the opposite direction as the tilting movement of the seat back. Therefore, a coupling point between the rear link and the seat cushion moves downward. Hence, it is possible to move the rear portion of the seat cushion downward without accompanying a substantial change in position of the seat cushion in forward and rearward directions.

In another embodiment, the force transmission device is configured such that the force is transmitted from the seat back to the rear link within a first range of a tiltable angle of the seat back and no substantial force is transmitted to the rear link within a second range of the tiltable angle. The seat back is usable as a backrest within the second range of the tiltable angle. With this arrangement, as long as the tilt angle of the seat back is adjusted within the second range, the seat cushion does not move in response to the movement of the seat back. Therefore, it is possible to hold the seat cushion at a seating position. In addition, it is possible to adjust the backrest angle of the seat back without affecting to the seating feeling.

In a further embodiment, the vehicle seat further includes a stopper device operable to stop the forwardly pivoting movement of the seat back at a predetermined forwardly pivoted position. The seat back can be tilted over an upper surface of the seat cushion when the stopper device is in an inoperative condition. Therefore, it is possible to stop the position of the seat back to enable a walk-in function. In addition, when the stopper device is in an inoperative condition, the seat back can be tilted by a large angle so as to be positioned over the upper surface of the seat cushion. Therefore, it is possible to enable a tilt-down function In a further embodiment, when the stopper device is in the inoperative condition, the seat cushion can shift downwardly by the pivotal movement of the front link and the rear link as the seat back tilts forwardly. With this arrangement, when the stopper device is in the inoperative condition, the seat back can be tilted by a large angle so as to be positioned over the upper surface of the downwardly shifted seat cushion. Therefore, it is possible to fold the vehicle seat and to position the entire vehicle seat at a lower level.

In a further embodiment, the vehicle seat further includes a slide device disposed between the support base and the vehicle floor for enabling a sliding movement of the vehicle seat in forward and rearward directions. The slide device is normally held in a lock condition to prevent the sliding movement of the vehicle seat. The lock condition is released when a forwardly tilting movement of the seat back is stopped at a predetermined forwardly pivoted position. Therefore, in order to broaden the space on the rear side of the vehicle seat, it is possible to forwardly slide the vehicle seat while the seat back is positioned at a forwardly tilted position.

A vehicle seat according to an embodiment of the present invention will now be described with reference to FIGS. 1 to 15. FIG. 1 schematically shows the construction of a seat assembly 1 of the vehicle seat. The seat assembly 1 includes a seat back 2 serving as a backrest, and a seat cushion 3 serving as a seating section. The seat back 2 and the seat cushion 3 are coupled to respective support bases 4. The support bases 4 are coupled to a surface of a vehicle floor F by means of a pair of right and left slide devices 30.

Figure 2:
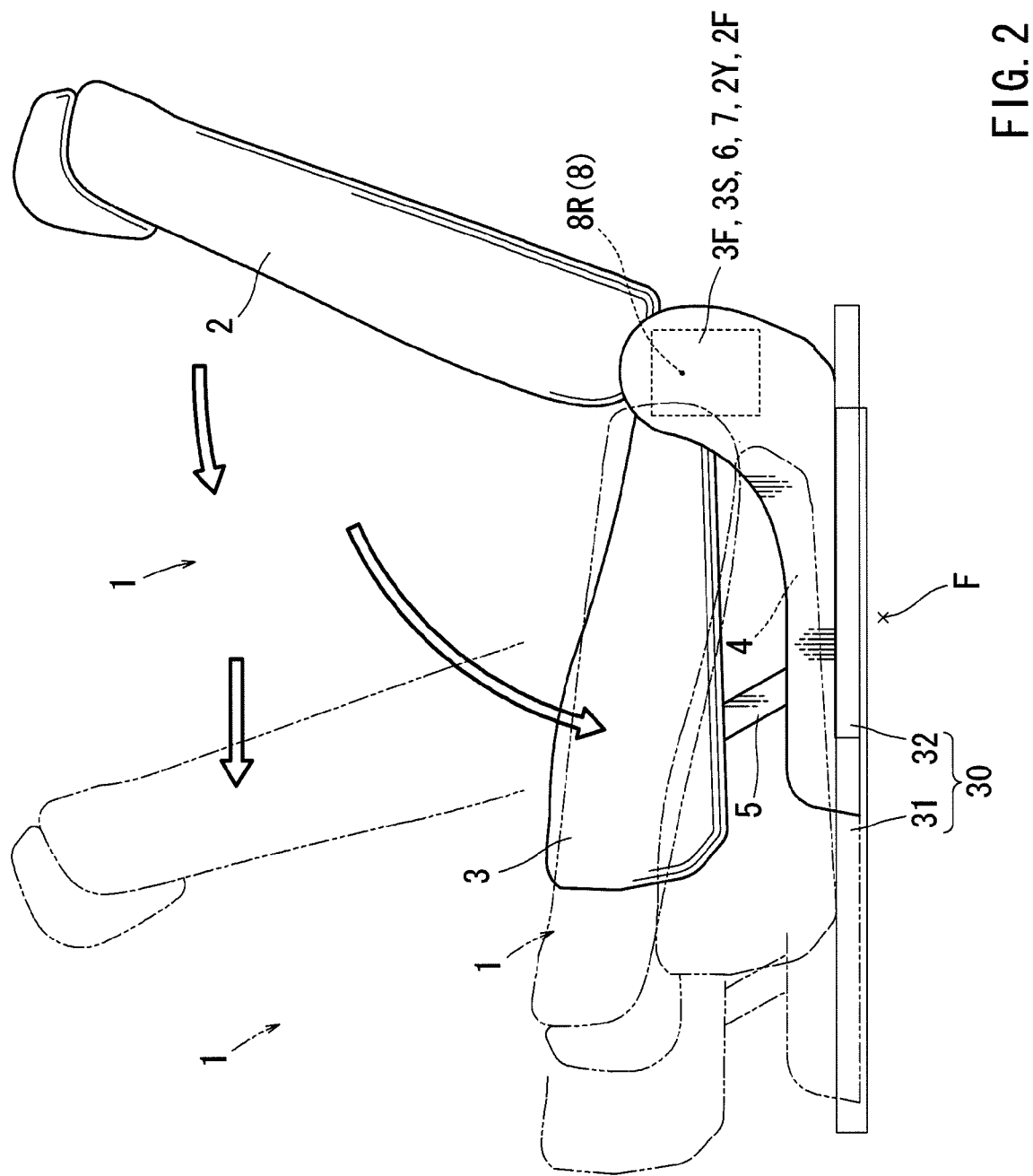
FIG. 2 is a schematic side view of the vehicle seat showing a tilt down position and a walk-in position of a seat assembly.

The vehicle seat of this embodiment is designed to enable a walk-in function and a tilt-down function. The walk-in function allows the movement of the seat assembly 1 to broaden a space on the rear side of the seat assembly 1, so that passengers can smoothly get on and off the vehicle. The tilt-down function allows the seat assembly 1 to be folded to have a compact size. More specifically, as shown in FIG. 2, the walk-in function allows the seat back 2 to be tilted forwardly and also allows the seat assembly 1 to slide forwardly with respect to a normal traveling direction of the vehicle. The walk-in function is enabled by the operation of a walk-in operation lever (not shown) provided at a shoulder of the seat back 2.

The tilt-down function allows the seat cushion 3 to be shifted downward in response to a forwardly tilting movement of the seat back 2. Similar to the case of the walk-in function, the tilt-down function is enabled by the operation of a tilt-down operation lever (not shown) provided at the shoulder of the seat back 2.

Operation mechanisms for the walk-in function and the tilt-down function will now be described. The seat back 2 has a gate-like back frame 2F constituting a framework of the seat back 2. Plate-like support bases 4 are attached to outer sides of leg portions of the back frame 2F via plate-like reclining devices 8, respectively. The reclining devices 8 serve as devices for preventing the pivotal movement of the back frame 2F about a central axis 8R. With this arrangement, the seat back 2 can pivot about the central axis 8R of the reclining devices 8 as the pivotal movement preventing functions of the reclining devices 8 are released or the reclining devices 8 are unlocked. As the reclining devices 8 are switched from the unlock conditions to lock conditions for preventing the pivotal movement of the seat back 2, the seat back 2 can be locked against the support bases 4 with respect to the pivotal movement.

The reclining devices 8 are normally held in the lock positions by a biasing device(s). When the walk-in operation lever or the tilt-down operation lever is operated, the reclining devices 8 are brought to the unlock conditions against the biasing force of the biasing device. In addition, each of the reclining devices 8 has a lock zone and a free zone. In the lock zone, the reclining device 8 returns from the unlock condition to the lock condition by the biasing force if the operation of the walk-in operation lever or the tilt-down operation lever is released. In the free zone, the reclining device 8 does not return from the unlock condition to the lock condition even if the operation of the walk-in operation lever or the tilt-down operation lever is released.

The lock zone is set to correspond to a first angular range of the seat assembly 1, which is normally used when the passenger is seated. More specifically, the first angular range is set between a first angle, where the seat back 2 is in an upright position relative to the floor F, and a second angle, where the seat back 2 is tilted rearwardly from the upright position. The free zone is set to correspond to a second angular range of the seat assembly 1, which is not normally used when the passenger is seated. More specifically, the second angular range is set between the first angle and a third angle, where the seat back 2 is tilted forwardly from the upright position.

Therefore, if the operation of the walk-in operation lever or the tilt-down operation lever is released after the seat back 2 has been tilted forwardly from the upright position even by a small angle, the seat back 2 may naturally tilt further forwardly. Here, a stop mechanism that will be described later is provided for stopping the forwardly tilting movement of the seat back 2 at a predetermined forwardly tilted position indicated by solid lines in FIG. 4 as the seat back 2 is tilted forwardly due to the operation of the walk-in operation lever. The construction of the stop mechanism will be described later with reference to FIGS. 9 to 15.

Figure 8:
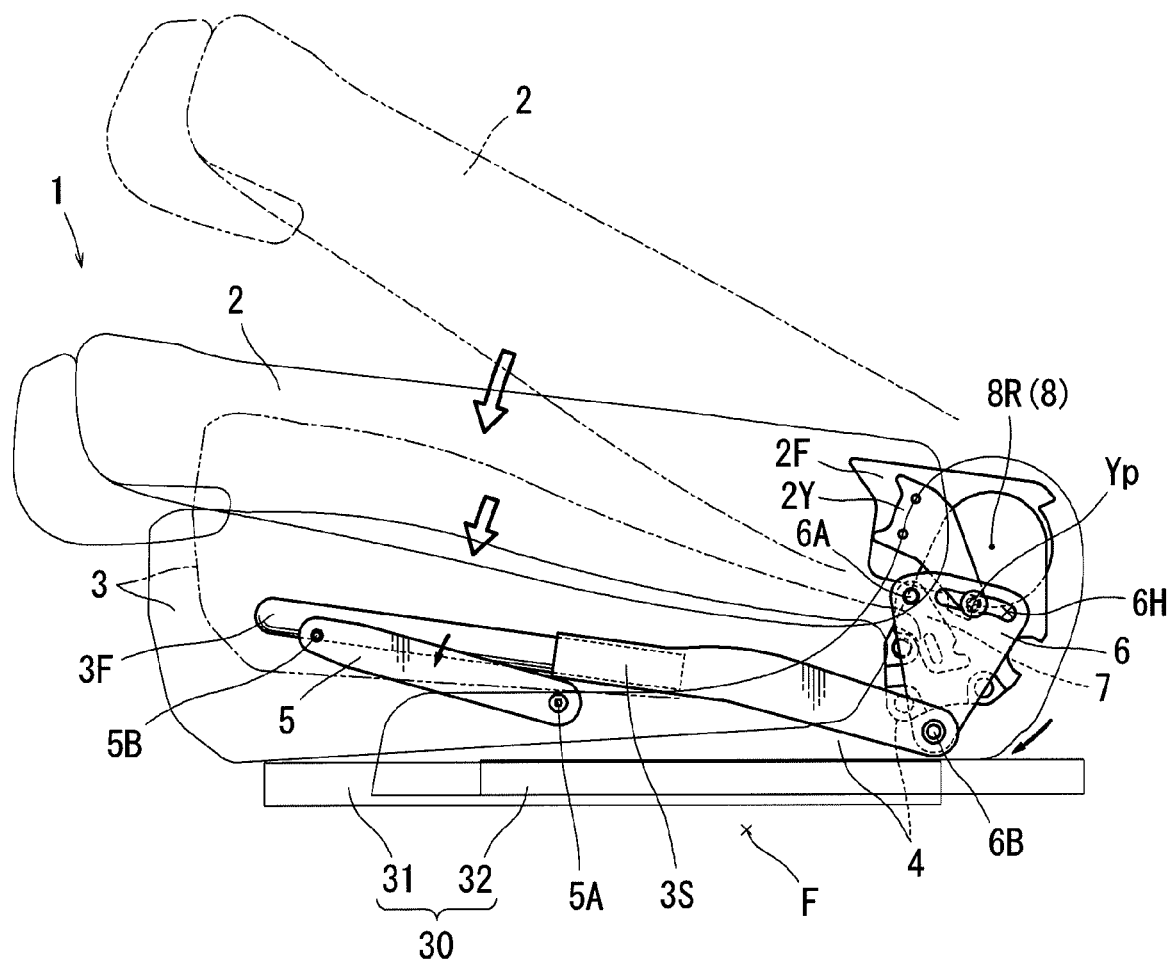
FIG. 8 is a schematic side view of the vehicle seat showing the tilt-down position of the seat assembly.

As the seat back 2 is tilted forwardly due to the operation of the tilt-down operation lever as shown in FIG. 8, a pawl-like stopper 2A formed on a front part of a lower end portion of the back frame 2F contacts with a stopper member 4S provided on each support base 4 (see FIG. 9), so that seat back 2 is prevented from a further forwardly tilting movement. The rearwardly tilting movement of the seat back 2 is restrained by the contact between a pawl-like stopper 2B formed on a rear part of the lower end of the back frame 2F and the stopper member 4S.

Returning to FIG. 4, the vehicle seat of this embodiment is configured such that the rear end of the seat cushion 3 shifts downward simultaneously with the forwardly tilting movement of the seat back 2, which movement is caused due to the operation of the walk-in operation lever. With this arrangement, when the seat back 2 is tilted forwardly, the lower end of the seat back 2 may not excessively bite into the rear end of the seat cushion 3. In other words, potential interference between the lower end of the seat back 2 and the rear end of the seat cushion 3 can be avoided or reduced. Therefore, when the seat back 2 is tilted forwardly, it is possible to avoid formation of depressions in the lower end of the seat back 2 and the rear end of the seat cushion 3 due to interference therebetween.

In addition, because the lower end of the seat back 2 may not excessively bite into the rear end of the seat cushion 3, the forwardly tilting movement of the seat back 2 can be smoothly performed without hindrance. Further, the vehicle seat of this embodiment is configured such that slide lock conditions of the slide devices 30 are released as the seat back 2 tilts forwardly due to the operation of the walk-in operation lever. Therefore, as the walk-in operation lever is operated, the seat back 2 is tilted forwardly, and at the same time, the entire seat assembly 1 can be slid forwardly with respect to the vehicle traveling direction as shown in FIG. 2.

Returning to FIG. 1, a structure for coupling the seat cushion 3 to the support bases 4 will be described. The seat cushion 3 has a gate-like cushion frame 3F constituting a framework of the seat cushion 3. The cushion frame 3F has a pair of legs extending rearwardly therefrom. Elongated plate-like boomerang links 3S are rigidly joined to the legs of the cushion frame 3F, respectively. The front ends of the legs of the cushion frame 3F are pivotally coupled to front ends of the respective support bases 4 via a pair of right and left elongated plate-like front links 5.

More specifically, the lower end of each front link 5 is pivotally coupled to a side plate portion of the corresponding support base 4 via a connecting rod 5A. The upper end of each front link 5 is pivotally coupled to a side plate portion formed on each leg of the cushion frame 3F via a connecting rod 5B. With this arrangement, as the front links 5 tilt forwardly toward the floor F, the seat cushion 3 shifts forwardly and downwardly as sequentially shown in FIGS. 5 to 8.

Figure 3:
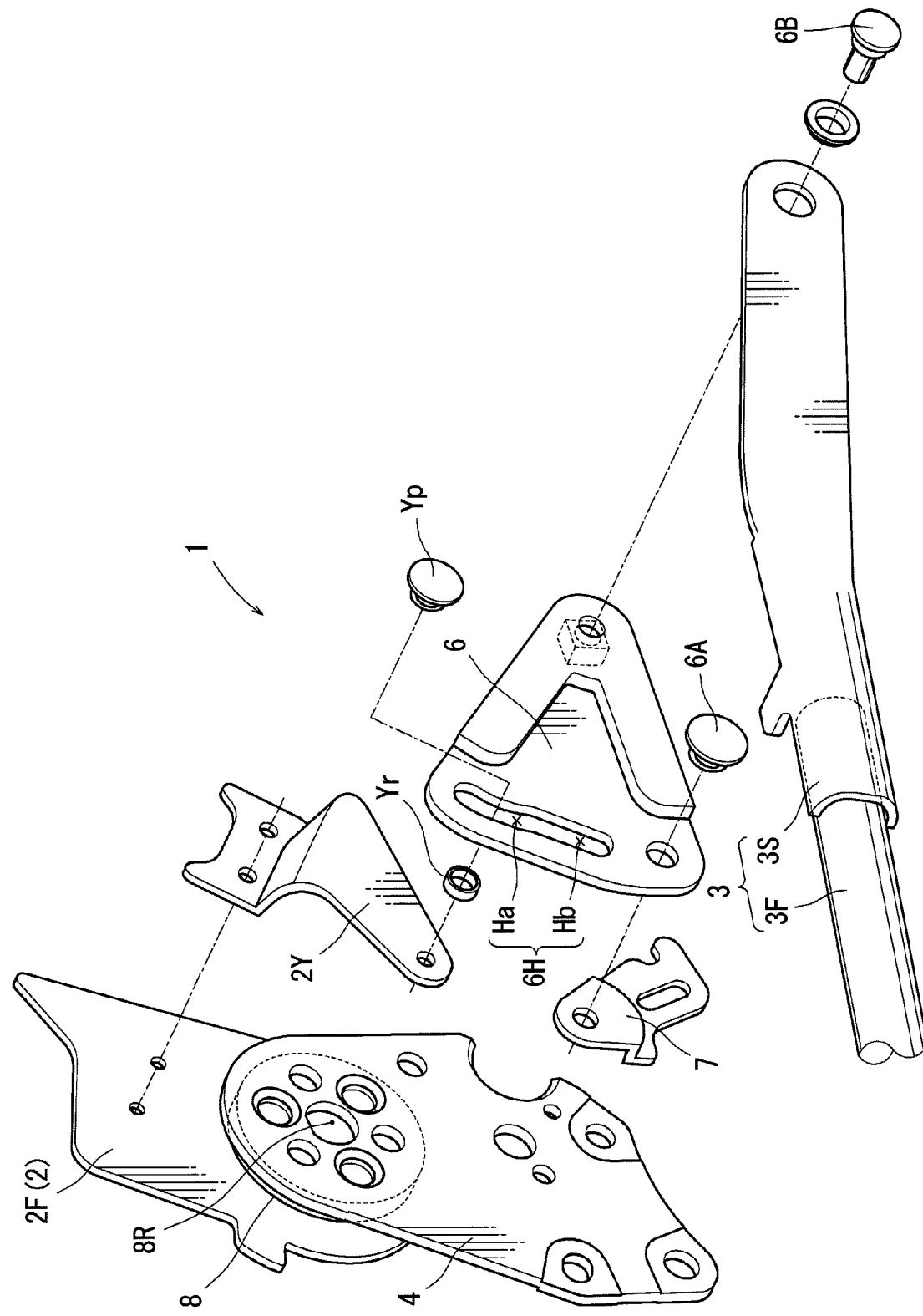
FIG. 3 is an exploded perspective view of a transmission mechanism of the vehicle seat.

Returning to FIG. 1, rear ends of the boomerang links 3S rigidly joined to the cushion frame 3F are pivotally coupled to triangular rear links 6, respectively, which are pivotally coupled to the respective support bases 4. More specifically, as shown in FIG. 3, a front lower end portion (left lower end portion as viewed in FIG. 3) of each rear link 6 is pivotally coupled to a base plate 7 of each support base 4 via a connecting rod 6A. The base plate 7 is fixedly joined to each support base 4.

The rear end of each boomerang link 3S is pivotally coupled to a rear lower end (right lower end as viewed in FIG. 3) of the corresponding rear link 6 via a connecting rod 6B. With this coupling structure given by the front links 5 and the rear links 6 described above, a pair of right and left multi-link mechanisms each having the front link 5 and the rear link 6 as opposing link elements are provided. Because the right and left multi-link mechanisms have the same construction, an explanation will be made to the construction of only one of the multi-link mechanisms.

The position of the multi-link mechanism can be maintained by an engaging structure between the rear link 6 and a crank plate-like transmission plate 2Y that is fixedly joined to the back frame 2 as shown in FIG. 3. The transmission plate 2Y has a tapered lower end and a pin Yp attached to the lower end. The pin Yp is slidably fitted into an elongated slot 6H formed in the rear link 6 along an inclined side edge on the front upper side (left upper side in FIG. 3) thereof. In this way, each transmission plate 2Y is coupled to the corresponding rear link 6.

A roller Yr is mounted to a shaft portion of the pin Yp, so that the pin Yp can smoothly rotate within the elongated slot 6H or can smoothly slide along the elongated slot 6H. The elongated slot 6H has an upper half configured as arc-shaped slot portion Ha curved in an arc shape, and a lower half configured as a cam slot portion Hb extending rectilinearly in a left lower direction as viewed in FIG. 3. The arc-shaped slot portion Ha has opposite side surfaces each extending along an arc about the central axis 8R of the reclining devices 8.

In the state where the reclining devices 8 are in the lock conditions and the seat back 2 is fixed at a desired backrest angle, the pin Yp fitted into the elongated slot 6H prevents the rear link 6 from rotation relative to the support base 4 about the connecting rod 6A. As described above, the arc-shaped slot portion Ha is configured to have an arc shape about the central axis 8R of the reclining device 8. Therefore, even if the backrest angle of the seat back 2 has been changed, the rear link 6 does not pivot as long as the pin Yp is positioned within the arc-shaped slot portion Ha.

The length of the arc-shaped slot portion Ha is determined such that the pin Yp is positioned always within the arc-shaped slot portion Ha when the backrest angle of the seat back 2 is adjusted within a range of the lock zone (corresponding to between the first angle, where the seat back 2 is in the upright position, and the second angle, where the seat back 2 is tilted rearwardly from the upright position, in particular, the second angle in this case may be an angle where the seat back 2 is positioned at a most rearwardly tilted position). Therefore, even if the backrest angle of the seat back 2 is adjusted within the range of the lock zone, the seat back 2 can tilt relative to the rear link 6, so that the pivotal position of the rear link 6 is held at a fixed position.

In this case, the rear link 6 may receive a load in a downwardly pivoting direction from the boomerang link 3S. Such a load may be produced by the gravity force of the seat cushion 3 and by a passenger who is seated on the seat cushion 3. However, the load applied to the rear link 6 in the pivoting direction causes the pin Yp to be pressed against the circumferential surface of the arc-shaped slot portion Ha in a radial direction with respect to the central axis 8R, about which the seat back 2 is tilted forwardly. Therefore, even if the load has been applied from the seat cushion 3 to the rear link 6 in the downward direction, the adjustment of the backrest angle of the seat back 2 can be smoothly performed.

As the seat back 2 tilts forwardly from the upright position by the operation of the walk-in operation lever or the tilt-down lever, the pin Yp is pressed against the rear link 6 to pivot the same. More specifically, as the seat back 2 tilts forwardly form the upright position, the pin Yp moves into the cam slot portion Hb of the elongated slot 6H. After that, the rear link 6 pivots in a clockwise direction as viewed in FIG. 3, because the pin Yp forces the rear link 6 to pivot in this direction as it slides along the cam slot portion Hb by the forwardly tilting movement of the seat back 2.

Figure 4:
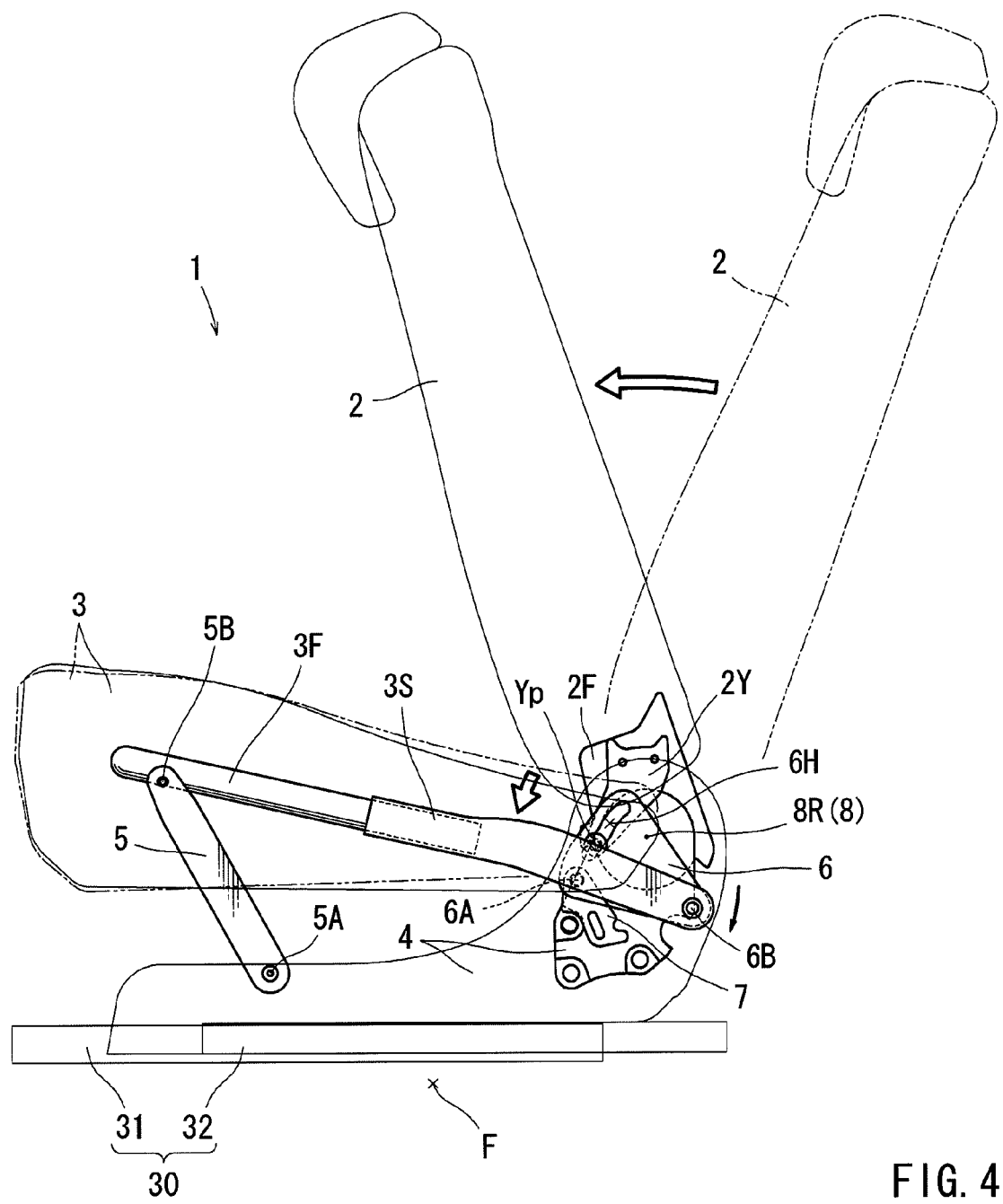
FIG. 4 is a schematic side view of the vehicle seat showing the walk-in position of the seat assembly.
Figure 5:
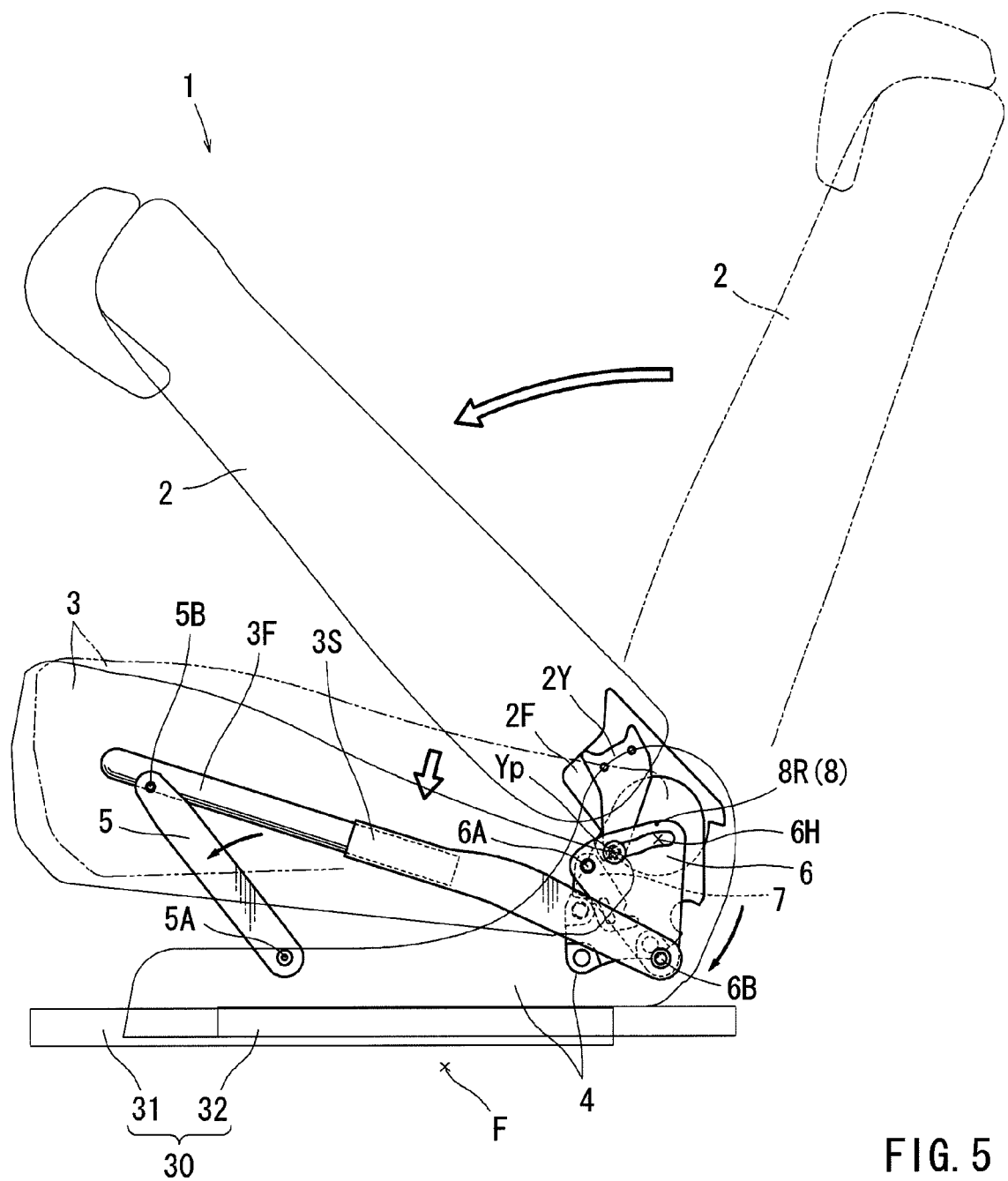
FIG. 5 is a schematic side view of the vehicle seat showing an intermediate position of the seat assembly between an upright position and the tilt-down position.
Figure 6:
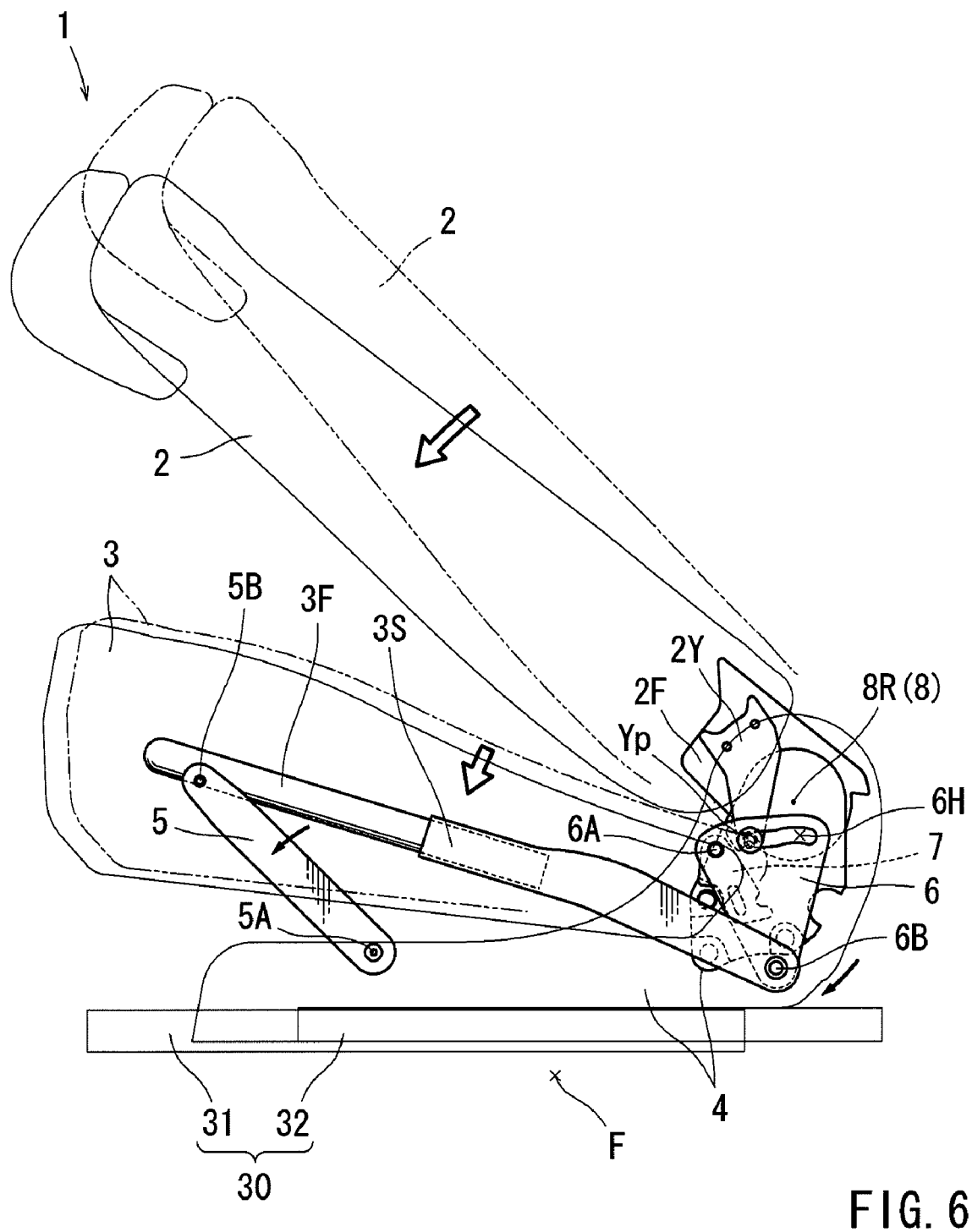
FIG. 6 is a schematic side view of the vehicle seat showing a position where the seat assembly has been moved further from the position shown in FIG. 5 toward the tilt-down position.
Figure 7:
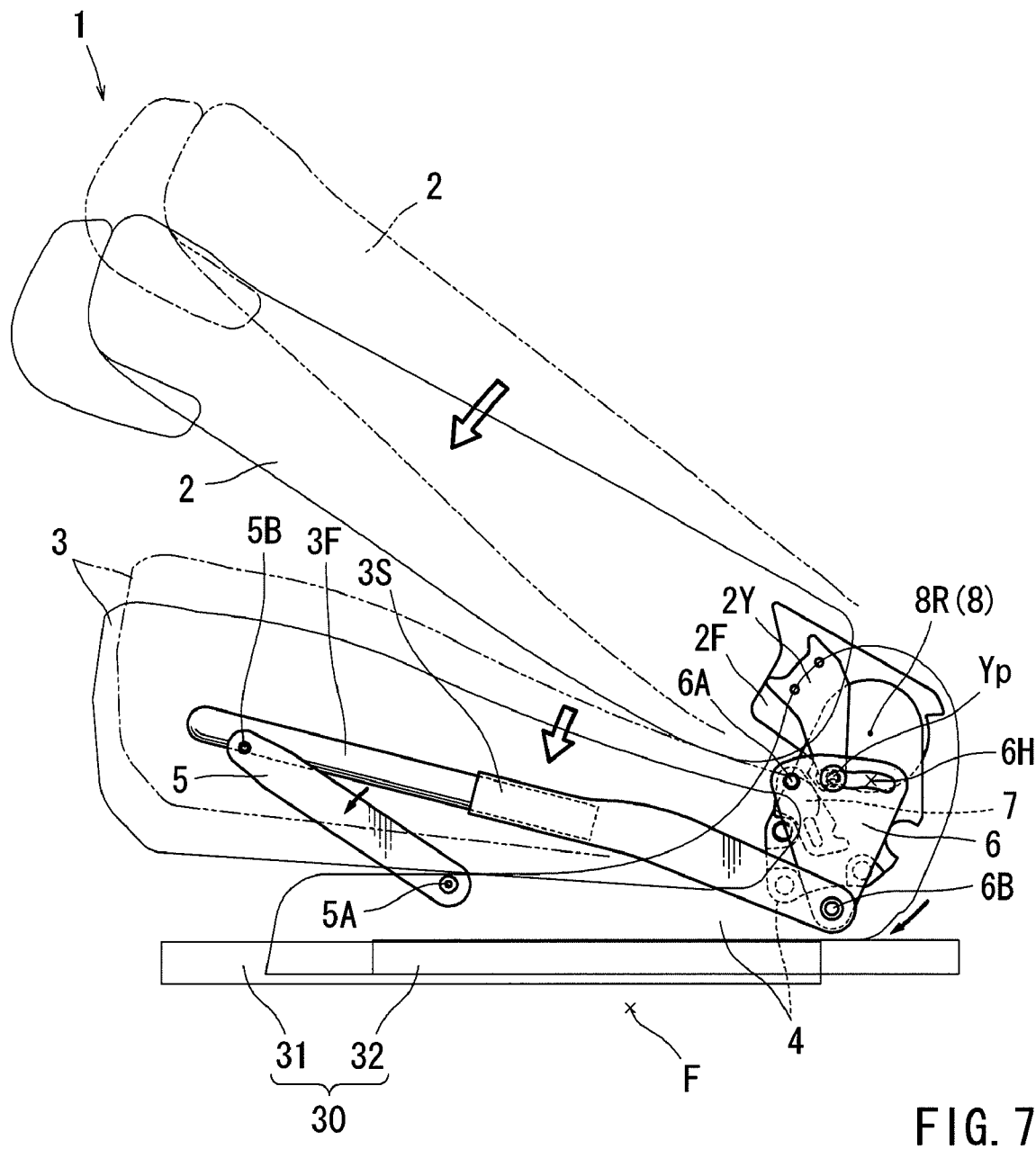
FIG. 7 is a schematic side view of the vehicle seat showing a position where the seat assembly has been moved further from the position shown in FIG. 6 toward the tilt-down position.

Because the pin Yp slides along the cam slot portion Hb while the rear link 6 pivots in the clockwise direction, the sliding movement of the pin Yp is performed in the following way. When the seat back 2 tilts forwardly by the operation of the walk-in operation lever of the seat back 2, the pin Yb moves downward along the path of the cam slot portion Hb as shown in FIG. 4. On the other hand, when the seat back 2 tilts forwardly by the operation of the tilt-down operation lever, the seat back 2 tilts by an angle larger than in the case of the operation of the walk-in operation lever, so that the pin Yb moves downward beyond the position of FIG. 4 toward one end of the cam slot portion Hb as shown in FIG. 5, and thereafter returns back toward the opposite end of the cam slot portion Hb because the cam slot portion Hb inclines obliquely downward as the rear link 6 pivots.

Returning to FIG. 1, the link length of the rear link 6 is set to be shorter than the link length of the front link 6. In addition, the connecting rod 6A connecting the rear link 6 to the support base 4 and the connecting rod 6B connecting the rear link 6 to the boomerang link 3S are arranged such that they are positioned on a substantially horizontally plane and are spaced from each other in forward and rearward directions when in the state shown in FIG. 1. Therefore, as the seat back 2 tilts forwardly to a walk-in position shown in FIG. 4, the connecting rod 6B moves substantially obliquely in a front lower direction (left lower direction as viewed in FIG. 4), because the rear link 6 pivots in the clockwise direction.

During this operation, the front link 5 having a long link length does not substantially pivot, and therefore, the cushion frame 3F shifts downward mainly at its rear end (rear ends of the boomerang links 3S). In addition, in the case that the seat back 2 tilts largely forwardly to a tilt-down position shown in FIG. 5, the connecting rod 6B of each rear link 6 moves substantially forwardly (leftwardly as viewed in FIG. 5) as the rear link 6 pivots in the clockwise direction.

With this movement of the connecting rod 6B, the boomerang link 3S is forced to move in the same direction, so that the front link 5 pivots forwardly. Due to these link movements of the front link 5 and the rear link 6, the entire seat cushion 3 is shifted largely downwardly. This downwardly shifting movement of the seat cushion 3 is stopped as the forwardly tilting movement of the seat back 2 is stopped when the stopper 2A formed on the back frame 2F abuts to the stopper member 4S provided on the support base 4 as shown in FIG. 8.

Returning to FIG. 3, a point where a force is transmitted from the pin Yp to the circumferential surface of the elongated slot 6H, i.e., a point where the pin Yp contacts with the circumferential surface of the elongated slot 6H, is set at a higher level than the connecting rod 6A that defines a coupling point between the rear link 6 and the support base 4. Therefore, the length of the transmission plate 2Y coupling between the pin Yp and the seat back 2 can be set to be shorter in correspondence to the setting of the pin Yp at a higher level.

Further, as the seat back 2 tilts forwardly, the rear link 6 pivots in a direction opposite to the tilting movement of the seat back 2. Because the rear link 6 pivots in the opposite direction, the pin Yp moves toward the seat back 2. Therefore, in comparison with the arrangement in which the pin Yp moves away from the seat back 2 as the rear link tilts forwardly, the length necessary for the transmission plate 2Y can be shortened. Because the length of the transmission plate 2Y that transmits the force to the rear link 6 is set to be shorter, it is possible to reduce the size of the transmission plate 2Y.

Next, returning to FIG. 1, the construction of the right and left slide devices 30 will be described. Because the right and left slide devices 30 have the same construction, only one of the slide devices 30 will be described. The slide device 30 includes a lower rail 31 and an upper rail 32 each having an elongated configuration and extending forwardly and rearwardly with respect to the traveling direction of the vehicle. The lower rail 31 is fixedly mounted to the floor F. The upper rail 32 is slidably mounted on the lower rail 31.

Each of the support bases 4 is fixedly attached to the upper surface of the corresponding upper rail 32, so that the entire seat assembly 1 can move forwardly and rearwardly as the upper rails 32 slide along the lower rails 31. Although not shown in the drawings, a lock device is provided between the upper rail 32 and the lower rail 31 for normally locking the sliding movement of the upper rail 32.

The slide lock condition of the lock device can be released as an operation lever (not shown) disposed at a front lower portion of the seat assembly 1 is pulled up. The slide lock condition can be also released by the operation of a stopper mechanism that can operate in response to the operation of the walk-in operation lever as will be explained later. Therefore, as the seat back 2 pivots forwardly to take the walk-in position shown in FIG. 4, it is possible to slide the seat assembly 1 forwardly for broadening the space on the rear side of the seat assembly 1, through which the passengers can get on and off the vehicle.

Figure 9:
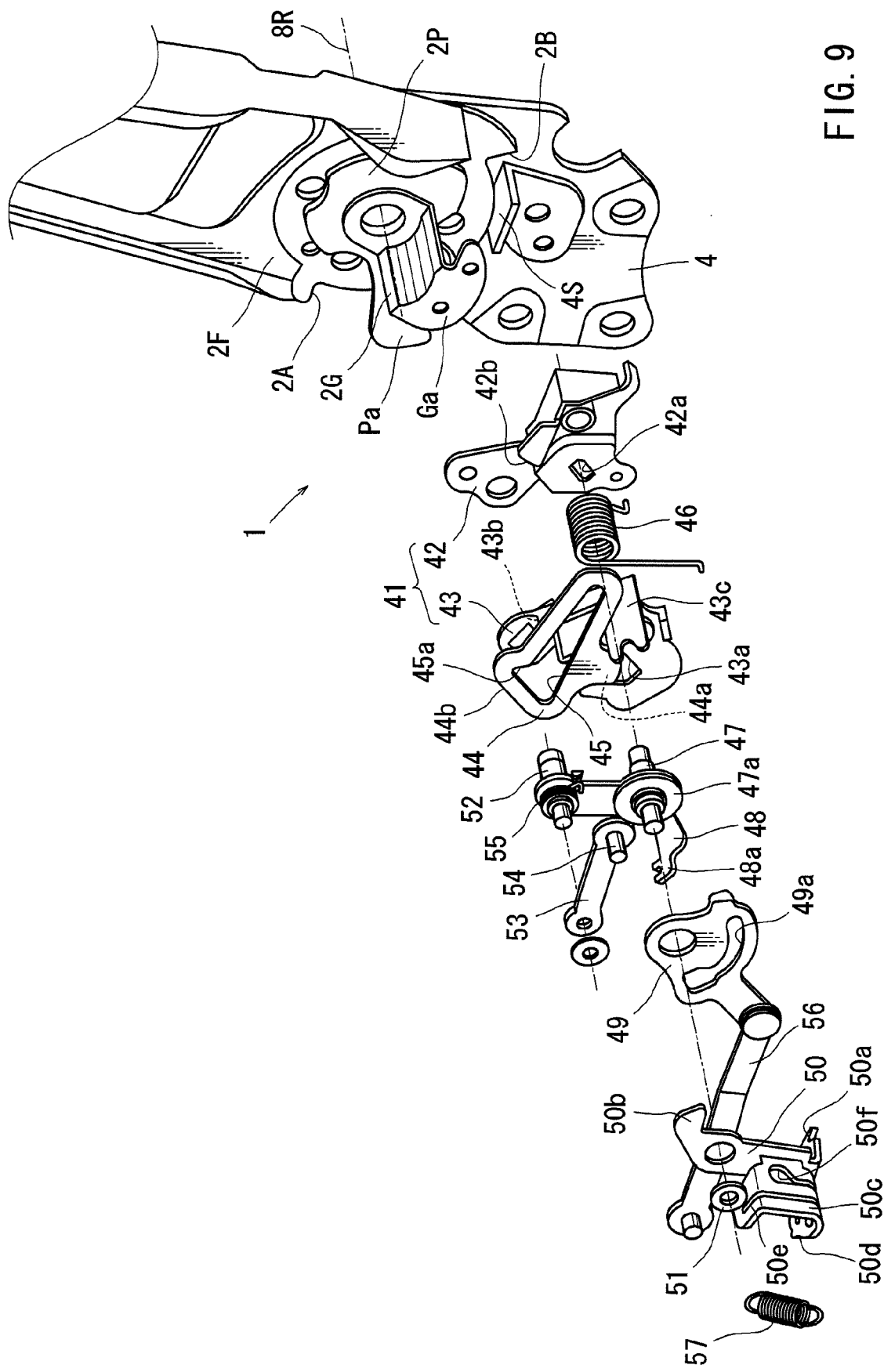
FIG. 9 is an exploded perspective view showing a stopper mechanism for stopping a forwardly tilting movement of a seat back.

The stopper device operating in response to the operation of the walk-in operation lever serves to stop the forwardly tilting movement of the seat back 2 at a predetermined forwardly tilted position. The construction of the stopper device is best shown in FIG. 9, which shows the support base 4 positioned on the right side as viewed from the inside of the seat assembly 1 in the front direction. The stopper member 4S is configured as a plate-like member that is joined to the inner side surface of the support base 4 and extends inwardly in a widthwise direction of the seat assembly 1 at a level below the back frame 2F.

The stopper 2A and the stopper 2B for stopping the forwardly tilting movement and the rearwardly tilting movement of the seat back 2, respectively, are formed on the lower end of the back frame 2F at positions spaced from each other in the forward and rearward directions. The stopper member 4S is positioned on a locus of movement of the stoppers 2A and 2B. As noted above, the stopper 2A defines a tilt angle limit of the back frame 2F with respect to the support base 4 when the seat back 2 tilts largely forwardly, while the stopper 2B defines a tilt angle limit of the back frame 2F when the seat back 2 tilts rearwardly.

A plate-like pressing member 2P is joined to the inner surface of the back frame 2F and is positioned around the central axis 8R. The pressing member 2P is formed with a pressing portion Pa positioned between the stoppers 2A and 2B. The pressing portion Pa is spaced inwardly from the back frame 2F in the widthwise direction of the seat assembly 1 and extends radially outward with respect to the central axis 8R. At the inner surface of the back frame 2F, where the pressing member 2P is joined, a plate-like guide member 2G is joined around the central axis 8R. A guide portion Ga is spaced inwardly from the back frame 2F further than the pressing portion Pa and extends radially outward with respect to the central axis 8R.

The guide portion Ga is positioned on the side of the stopper 2B with respect to the pressing portion Pa in the circumferential direction of the central axis 8R. The distance between the central axis 8R and the tip end of the guide portion Ga in the radial direction of the central axis 8R is set to be shorter than the distance between the central axis 8R and the base end of the pressing portion Pa in the radical direction. Therefore, when the pressing portion Pa and the guide portion Ga rotate with the back frame 2F, the locus of rotation of the pressing portion Pa and the locus of rotation of the guide portion Ga do not overlap with each other with respect to both of the radial direction of the central axis 8R and the widthwise direction of the seat assembly 1.

Figure 15:
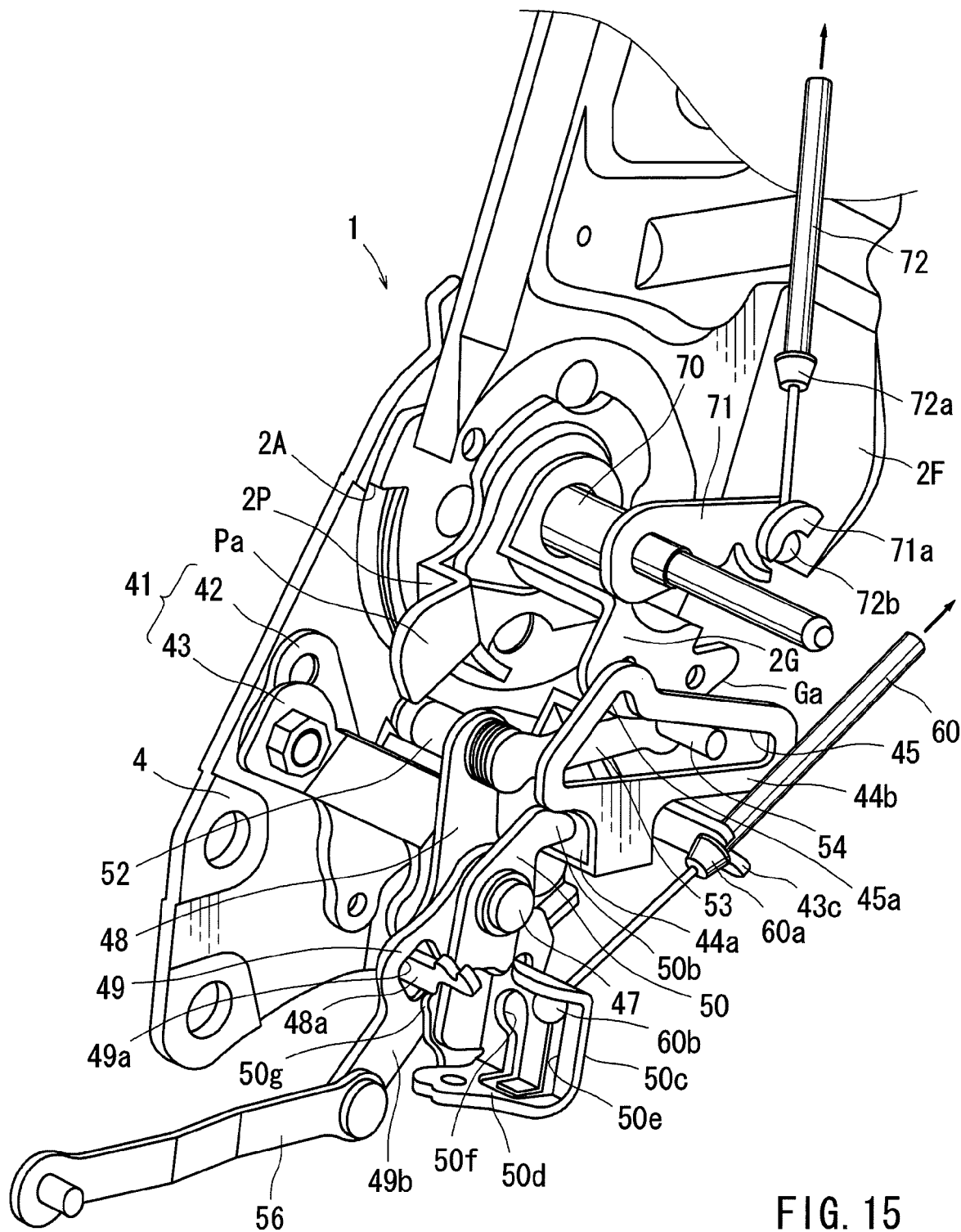
FIG. 15 is a perspective view of the stopper mechanism.

Further, each of the pressing member 2P and the guide member 2G has a circular opening about the central axis 8R to enable connection between the corresponding reclining device 8 and an operational rod 70 (see FIG. 15) that can be actuated for releasing the lock condition of the reclining device 8. A connecting lever 71 shown in FIG. 15 is fixedly attached to the operation rod 70 and has a tip end formed with a cable support member 71a. The cable support member 71a is in engagement with a ball-like terminal end 72b of an operation cable 72 that is supported by the back frame 2F via a nosepiece 72a. The operation cable 72 is coupled to the walk-in operation lever and the tilt-down operation lever. Therefore, when either one of the walk-in operation lever and the tilt-down operation lever is operated, the operation cable 72 pulls the operation rod 70 at the terminal end 72b, so that the operation rod 70 rotates in a counterclockwise direction as viewed in FIG. 15 to release the lock condition of the reclining device 8.

By a tightening operation using a bolt and a nut, a base member 41 is fixedly mounted to the inner surface of the support base 4 at a position where the base member 41 does not interfere with the stopper member 4S. A pair of a first base bracket 42 and a second base bracket 43 are integrated to form the base member 41 and are arranged along the widthwise direction of the seat assembly 1. The first base bracket 42 is lapped with the inner surface of the support base 4, to which the stopper member 4S is joined. The second base bracket 43 is lapped with the inner surface of the first base bracket 42. With this arrangement, the first and second base brackets 42 and 43 are jointly and fixedly mounted to the support base 4.

As shown in FIG. 9, a substantially rectangular mounting slot 42a is formed in the central portion of the first base bracket 42 and extends therethrough in the widthwise direction of the seat assembly 1. A plate-like first stopper member 42b is formed with the first base bracket 42 and extends upwardly therefrom. The first stopper member 42b is positioned on the upper side of the mounting slot 42a and between the stopper 2A and the pressing portion Pa with respect to the widthwise direction of the seat assembly 1.

Similarly, a substantially rectangular mounting slot 43a is formed in the central portion of the second base bracket 43 and extends therethrough in the widthwise direction of the seat assembly 1. A plate-like second stopper member 43b is formed with the second base bracket 43 and extends upward therefrom. The second stopper member 43b is positioned on the upper side of the mounting slot 43a and between the pressing portion Pa and the guide portion Ga with respect to the widthwise direction of the seat assembly 1. In this way, the first and second stopper members 42b and 43b are spaced from each other such that the pressing portion Pa is positioned therebetween with respect to the widthwise direction. Further, a cable support member 43c is formed on the second base bracket 43 and extends in the widthwise direction of the seat assembly 1. A nosepiece 60a of a cable 60 shown in FIG. 15 is supported by the cable support member 43c.

A plate-like sensor bracket 44 is fixedly attached to the central portion of the inner surface of the second base bracket 43 at a position where it does not interfere with the mounting slot 43a. The sensor bracket 44 is formed with a stopper wall portion 44a and a guide wall portion 44b. The stopper wall portion 44a extends from the inner surface of the second base bracket 43 in a direction inwardly with respect to the widthwise direction of the seat assembly 1. The guide wall portion 44b extends from the stopper wall portion 44a in such a manner that it is bent upward from the stopper wall portion 44a. An elongated slot 45 is formed in the guide wall portion 44b and extends in the forward and rearward directions of the seat assembly 1. An upwardly depressed engaging recess 45a defining an acute angle is formed in continuity with a part on one side of the elongated slot 45.

A cable spring 46 constituted by a torsion coil spring is interleaved between the first and second base brackets 42 and 43 and is positioned coaxial with the mounting slots 42a and 43a. The first base bracket 42 engages one end of the cable spring 46. A hinge pin 47 is secured to the base member 41. One end of the hinge pin 47 is inserted into the mounting slot 43a and the cable spring 46 and is then fitted into the mounting slot 42a. Please note that the hinge pin 47 is naturally positioned at a level lower than the first and second stopper members 42b and 43b.

A circular disk-like flange 47a is formed integrally with a middle portion in an axial direction of the hinge pin 47 and extends radially outwardly therefrom. A main link 48 has a configuration of a plate-like arm. A middle portion with respect to a lengthwise direction of the main link 48 is rotatably supported on the hinge pin 47 at a position between a surface of the flange 47a and a surface of the second base bracket 43 that oppose to each other. A predetermined clearance is ensured between the surface of the second base bracket 43 (or the base member 41), to which the hinge pin 47 is fixedly attached, and the surface of the flange 47a opposed thereto, so that the main link 48 can smoothly rotate about the hinge pin 47. The main link 48 is positioned to extend between the second stopper member 43b and the guide wall portion 44b with respect to the widthwise direction of the seat assembly 1.

A part of the hinge pin 47 positioned on the side opposite to the main link 48 with respect to the flange 47a is inserted into a plate-like sub-link 49 having a sectorial configuration and further into a plate-like cable link 50 serving as an operation link. An annular washer 51 is fixedly attached to the tip end of the hinge pin 47, so that the sub-link 49 and the cable link 50 are prevented from being removed form the hinge pin 47, while the sub-link 49 and the cable link 50 are rotatable about the hinge pin 47. Therefore, the main link 48, the sub-link 49 and the cable link 50 have the same rotational axis that coincides with the axis of the hinge pin 47. A predetermined clearance is ensured between the washer 51 and the surface of the flange 47a opposed thereto, so that the sub-link 49 and the cable link 50 can smoothly rotate about the hinge pin 47.

A substantially cylindrical walk-in stopper pin 52 is fixedly attached to one end of the main link 48 and has a central axis extending in the widthwise direction of the seat assembly 1. The axial length of the walk-in stopper pin 52 is determined such that the walk-in stopper pin 52 can contact with the first and second stopper members 42b and 43b as it rotates in one direction and an opposite direction, respectively. In other words, the rotational range of the main link 48 is limited between a position where the walk-in stopper pin 52 contacts with the first stopper member 42*b*, and a position where the walk-in stopper pin 52 contacts with the second stopper member 43*b*.

A sensor link 53 having a configuration of a plate-like arm is pivotally supported on the main link 48. The sensor link 53 is positioned on the side opposite to the walk-in stopper pin 52 and is pivotable about the same axis as the rotational axis of the walk-in stopper pin 52. A sensor pin 53 extends from the tip end of the sensor link 53 and is inserted into the elongated slot 45 of the sensor bracket 44 from the side of the second base bracket 43. A sensor spring 55 biases the sensor pin 54 in a direction for contacting with the upper circumferential surface of the elongated slot 45. The sensor spring 55 is constituted by a coil spring that has one end engaged with the main link 48 and the other end engaged with the sensor link 53. Here, the position of the guide portion Ga of the guide member 2G with respect to the widthwise direction of the seat assembly 1 is set to be between the sensor bracket 44 and the sensor link 53.

An engaging member 48*a* is formed with the other end of the main link 48 and is bent from the main link 48 in the widthwise direction of the seat assembly 1. The engaging member 48*a* is inserted into an elongated slot 49*a* formed in the sub-link 49 and having an arc-shape about the hinge pin 47. Therefore, the range of relative rotation between the main link 48 and the sub-link 49 is limited by engagement of the engaging member 48*a* with the circumferential surface of the elongated slot 49*a*.

The sub-link 49 is formed with an arm-like extension 49*b* extending radially outward from the sub-link 49. A connecting link 56 is pivotally connected to the tip end of the extension 49*b* and can advance and retreat as the sub-link 49 pivots. Hence, as the sub-link 49 pivots about the hinge pin 47, the sub-link 49 forces the connecting link 56 to advance for releasing the slide lock condition of the slider device 30 (see FIG. 1). A biasing device (not shown) provided at the slider device 30 biases the sub-link 49 via the connecting link 56 in such a direction that the sub-link 49 pivots in a counterclockwise direction about the hinge pin 47.

As described previously, the first base bracket 42 engages one end of the cable spring 46. A support member 50*a* formed on one end of the cable link 50 engages the other end of the cable spring 46. A hook portion 50*b* is formed on the other end of the cable link 50 and is in engagement with the stopper wall portion 44*a* of the sensor bracket 44 by the biasing force of the cable spring 46 that urges the cable link 50 in the clockwise direction about the hinge pin 47.

A restricting wall portion 50*c* is formed on the cable link 50 and has a U-shaped configuration with its open side oriented toward the widthwise direction of the seat assembly 1. A support member 50*d* is formed on the lower portion of the restricting wall portion 50*c* and engages one end of a main spring 57. A tip end of the engaging member 48*a* of the main link 48 engages the other end of the main spring 57. The engaging member 48*a* is inserted into the elongated slot 49*a* of the sub-link 49. The main spring 57 serves to biases the main link 48 in a counterclockwise direction about the hinge pin 47 relative to the cable link 50.

An elongated slot 50*e* is formed in the restricting wall portion 50*c* for engaging a ball-like terminal end 60*b* of the cable 60 that has the nosepiece 60*a* supported by the cable support member 43*c* (see FIG. 15). The elongated slot 50*e* extends along the U-shape of the restricting wall portion 50*c* and has a lower portion that is tuned upward like a U-shape and connected to a mounting slot 50*f*. The mounting slot 50*f* allows the terminal end 60*b* of the cable 60 to be engaged with and disengaged from the elongated slot 50*e*. Thus, in order to engage the terminal end 60*b* with the elongated slot 50*e*, the terminal end 60*b* is first inserted into the mounting slot 50*f*, moved downward along the upwardly turned lower portion of the elongated slot 50*e*, and thereafter tuned upward to reach the upper end of the elongated slot 50*e*.

The cable 50 is connected to the tilt-down operation lever, and therefore, as this operation lever is operated, the operational force is transmitted to the cable 60 and pulls the terminal end 60*b* toward the operation lever, so that the cable link 50 is pivoted in the counterclockwise direction against the biasing force of the cable spring 46. In this embodiment, the operational force applied to the tilt-down operation lever is also transmitted to the operation cable 72 in addition to the cable 60. In other words, the operational force of the tilt-down operation lever is transmitted such that the cable 60 and the operation cable 72 are interlocked with each other. Here, as the cable link 50 pivots, the main link 48 connected to the cable link 50 via the main spring 57 rotates in unison therewith. The resiliency of the main spring 57 is determined such that no substantial resilient deformation is caused during this operation.

Figure 10:
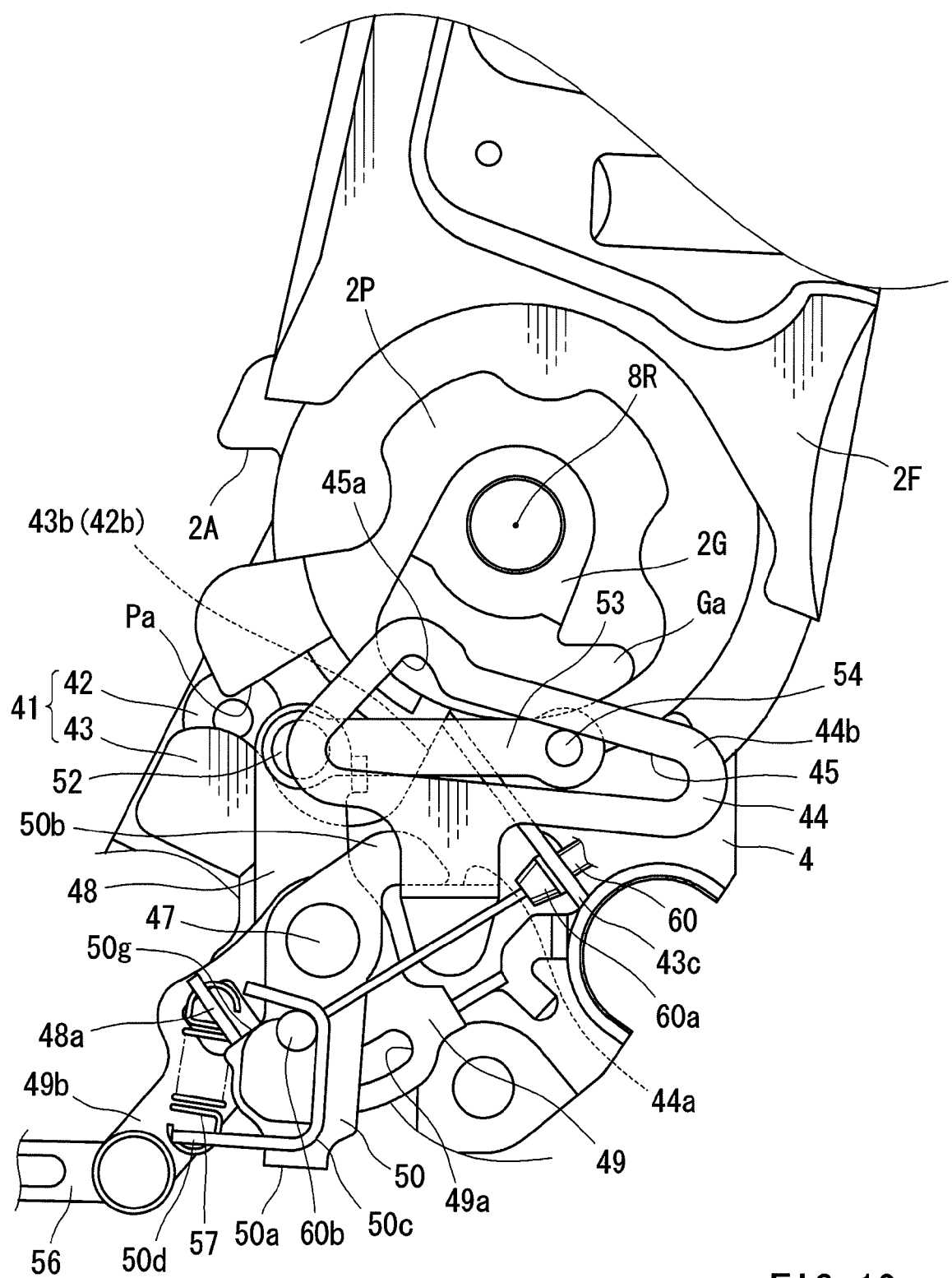
FIG. 10 is a side view of the stopper mechanism when the seat assembly is in a seating position used when a passenger is seated.

The operation of the above embodiment will now be described. As shown in FIG. 10, when no operational force is applied to the tilt-down operation lever in the seating position of the seat assembly 1, the hook portion 50*b* of the cable link 50 is engaged by the stopper wall portion 44*a* of the sensor bracket 44 by the biasing force of the cable spring 46, so that the cable link 50 is held in position relative to the base member 41. In this state, the cable 60 extends such that the terminal end 60*b* of the cable 60 engaged by the tip end of the elongated slot 50*e* enters the corner formed on the upper portion of the restricting wall portion 50*c*. In addition, the main link 48 coupled to the cable link 50 via the main spring 57 is held in position by the biasing force of the main spring 57 in the state where the engaging member 48*a* is in contact with a stopper portion 50*g* of the cable link 50. In other words, the main link 48 is positioned relative to the base member 41 via the cable link 50.

Further, in this state, the walk-in stopper pin 52 provided on the main link 48 is positioned on the locus of the rotational movement of the pressing portion Pa about the central axis 8R. The sensor pin 54 provided on the sensor link 53 is positioned at the middle position along the lengthwise direction of the elongated slot 45 and is in contact with the upper portion of the circumferential surface of the elongated slot 45 by the biasing force of the sensor spring 55. Here, the rotational position of the main link 48 in the seated position (also may be called "walk-in standby position") defines a reference position in designing the main link 48. This reference position is determined to be a middle position of the operational range of the main link 48 in correspondence with the movable range of the sensor pin 54 within the elongated slot 45. The position of the sub-link 49 biased by the biasing device of the slider device 30 via the connecting link 56 is determined such that the engaging member 48*a* is positioned at one end in the circumferential direction (clockwise direction) of the elongated slot 49*a*.

When the walk-in operation lever is operated in this state, the operational force of the walk-in operation lever is applied to the operation cable 72, so that the terminal end 72 of the operation cable 72 is pulled to release the lock condition of the reclining device 8. Then, the seat back 2 tilts forwardly and the back frame 2F tilts in the counterclockwise direction about the central axis 8R. Therefore, the pressing member Pa rotates to be pressed against the walk-in stopper pin 52 positioned on the locus of rotation of the pressing member Pa.

Figure 11:
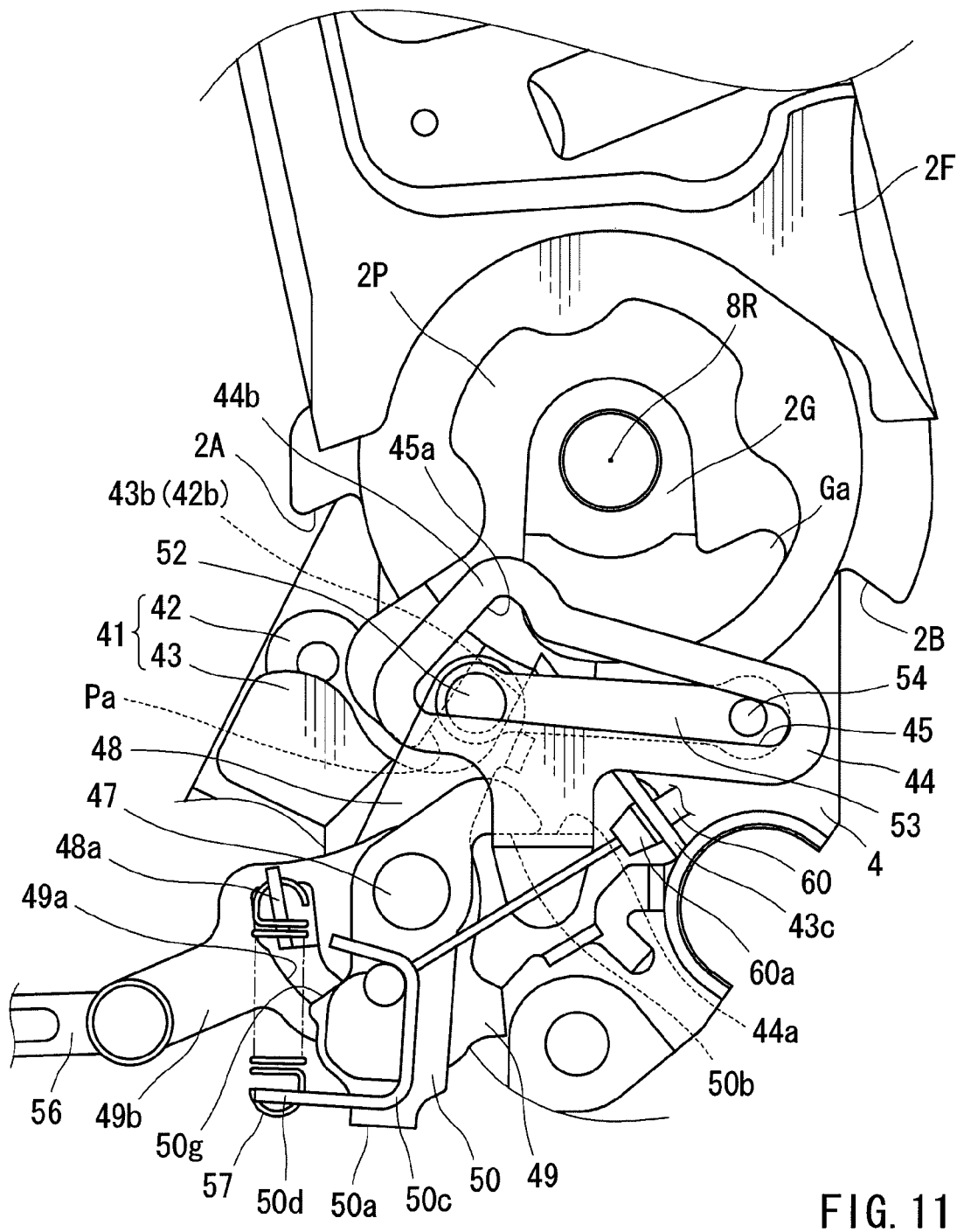
FIG. 11 is a side view of the stopper mechanism when the seat assembly has been moved to the walk-in position.

Then, the main link 48 pivots in the clockwise direction against the biasing force of the main spring 57, while the sensor pin 54 provided on the sensor link 53 moves along the elongated slot 45 toward its one end (right end as viewed in FIG. 10). Therefore, the walk-in stopper pin 52 is brought to contact with the first and second stopper members 42b and 43b as shown in FIG. 11, resulting in that the rotation of the pressing member Pa is restricted by the walk-in stopper pin 52. Consequently, the back frame 2F or the seat back 2 is held in a forwardly tilted position that is a position taken when the seat assembly 1 is the walk-in position. In this way, the main link 48 having the walk-in stopper pin 52 provided thereon serves as a stopper when the walk-in position is taken.

On the other hand, as the main link 48 pivots in the clockwise direction, the engaging member 48a is pressed against the circumferential surface of the elongated slot 49a to cause pivotal movement in the clockwise direction of the sub-link 49 against the biasing force of the slider device 30. Then, the connecting link 56 connected to the sub-link 49 is forced to advance, so that the lock condition of the slider device 30 is released in response to the tilting movement of the back frame 2F. As a result, the seat assembly 1 can slide forwardly.

Because the base member 41 retains the cable link 50 via the sensor bracket 44, the cable link 50 does not interfere with the operation of the cable 60. On the other hand, when the seat assembly retunes from the walk-in position shown in FIG. 11 to the seating position shown in FIG. 10, the seat back 2 is raised to be tilted rearwardly, so that the back frame 2F pivots in the clockwise direction about the central axis 8R. Then, with the aid of the biasing force of the main spring 57, the main link 48 moves toward the original position for the seating position as the walk-in stopper pin 52 moves to follow the movement of the pressing portion Pa. Subsequently, the main link 48 is held in the original position when the engaging member 48a contacts with the stopper portion 50g. In addition, the sub-link 49 is released from being pressed by the engaging member 48a at the elongated slot 49a, so that the sub-link 49 returns to the original position for the seating position by the biasing force of the biasing device of the slider device 30.

When the tilt-down operation lever is operated in the seating position of the seat assembly 1 shown in FIG. 10, the operational force of the tilt-down operation lever is applied to the cable 60, so that the terminal end 60b of the cable 60 is pulled to rotate the cable link 50 in the counterclockwise direction against the biasing force of the cable spring 46. Then, the main link 48 coupled to the cable link 50 via the main spring 57 pivots in unison with the cable link 50, while the sensor pin 54 provided on the sensor link 53 slidably moves along the elongate slot 45 toward its left side end as viewed in FIG. 10.

Figure 13:
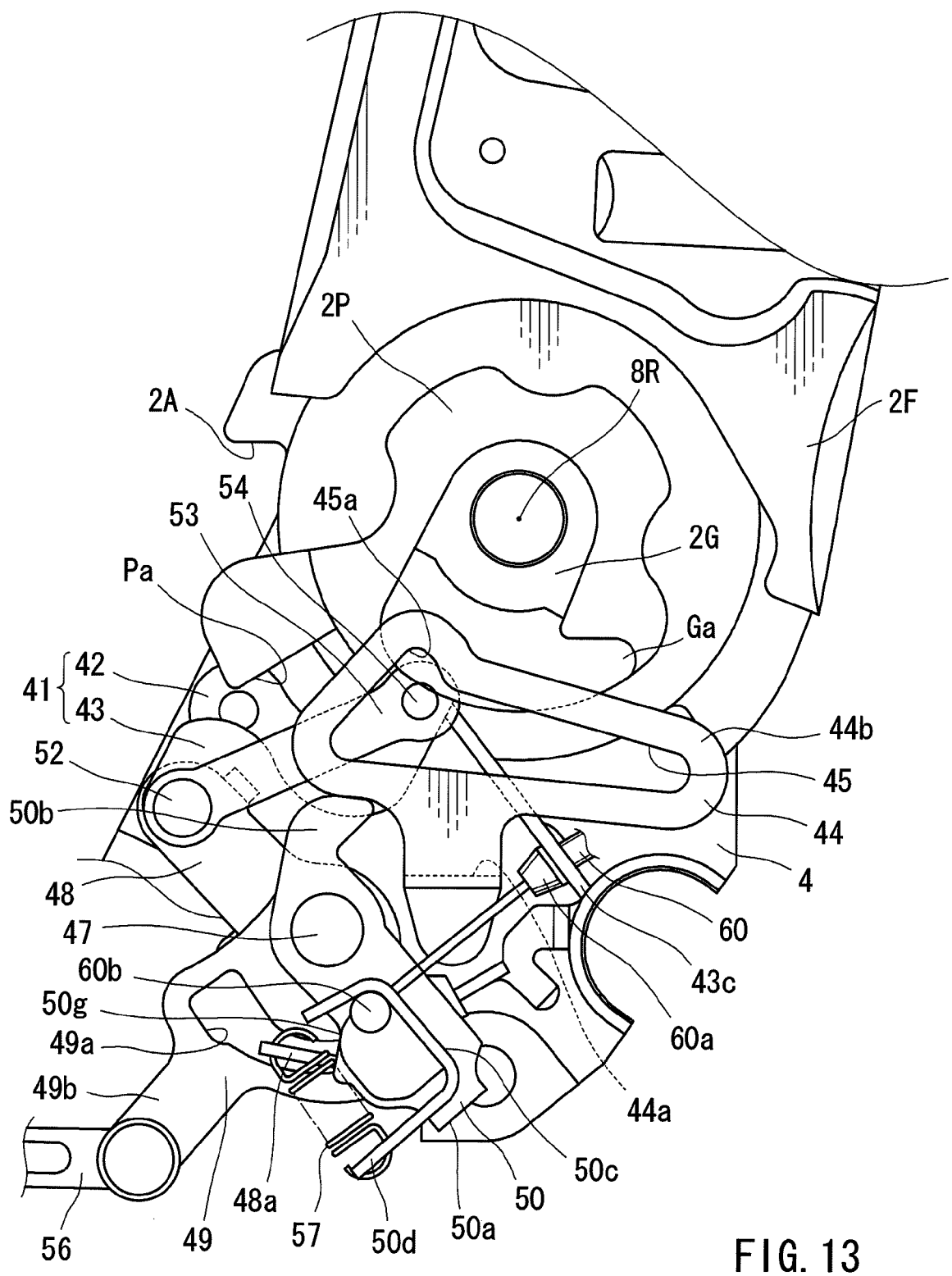
FIG. 13 is a side view of the stopper mechanism when the seat assembly returns from the tilt-down position.

On the other hand, the walk-in stopper pin 52 provided on the main link 48 moves to a position out of the locus of rotation of the pressing portion Pa about the central axis 8R as shown in FIG. 13. However, the sensor pin 54 is still not in engagement with the engaging recess 45a due to interruption by the guide portion Ga. Therefore, the main link 48 is permitted to rotate about the hinge pin 47. Incidentally, the operation cable 72 is operated simultaneously with the operation of the cable 60, so that the terminal end 72b of the operation cable 72 is pulled to rotate the operation rod 70. However, in the state shown in FIG. 13, the lock condition of the reclining device 8 is still not released even by this operation.

Figure 14:
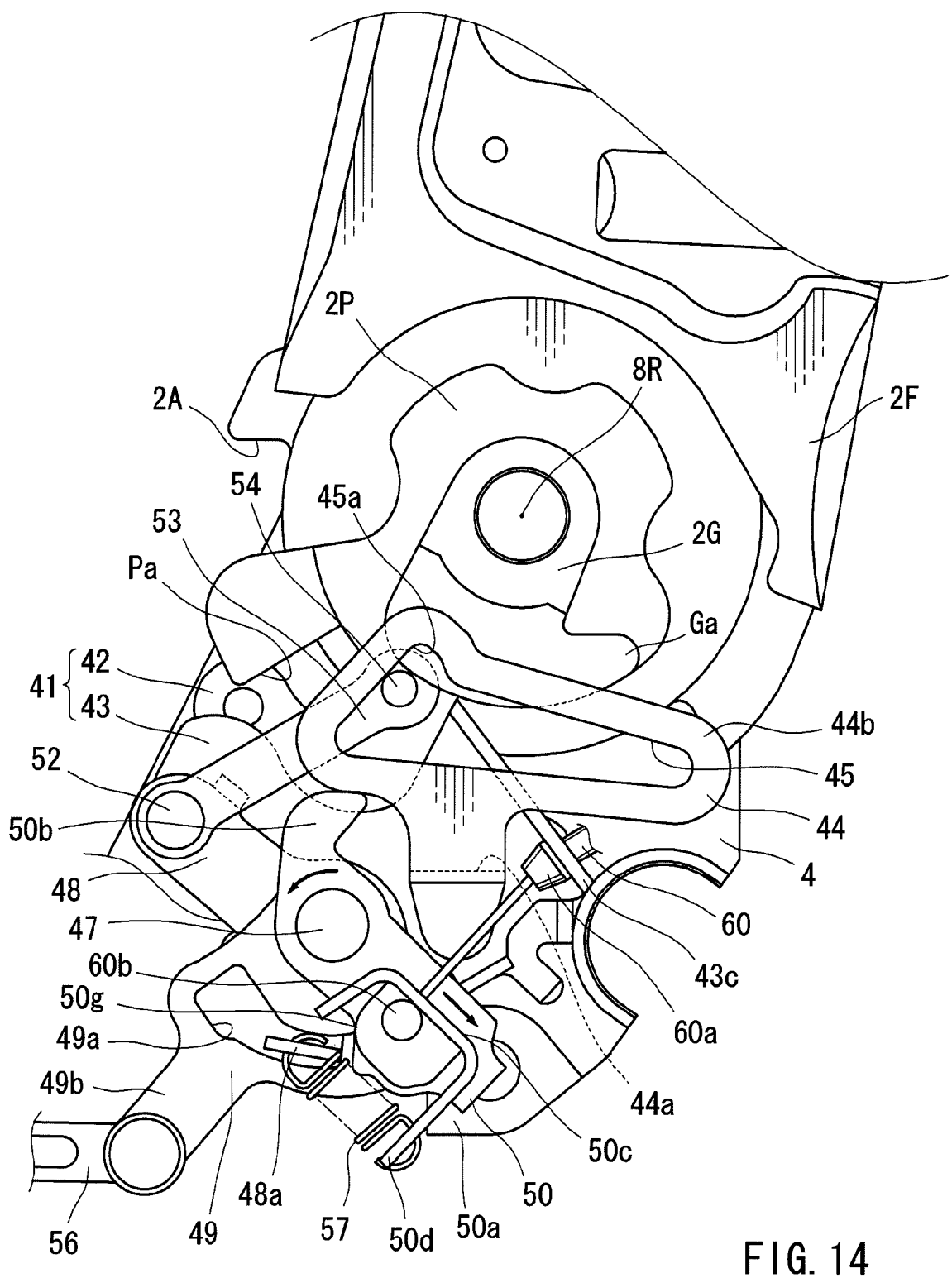
FIG. 14 is a side view of the stopper mechanism when an operation for locking a reclining device is completed.

As the terminal end 72b of the operation cable 72 is pulled further by the operation of the cable 60, the lock condition of the reclining device 8 is released. At that time, the walk-in stopper pin 52 provided on the main link 48 is positioned out of the locus of the rotational movement of the pressing portion Pa about the central axis 8R. However, because the terminal end 60b of the cable 60 is pulled further as the operation cable 72 is pulled, the cable link 50 rotates further in the counterclockwise direction as shown in FIG. 14 together with the main link 48 coupled to the cable link 50 via the main spring 57. However, the terminal end 60b is pulled while it extends by an acute angle relative to the extending direction of the elongated slot 50e. Therefore, due to a component of the pulling force in the extending direction of the elongated slot 50e, the terminal end 60b moves along the elongated slot 50e. For this reason, it is possible to reduce the amount of change in the pivoting angle of the cable link 50, etc. relative to the pulling amount or the operation amount of the cable 60. More specifically, the amount of change in the pivotal angle of the cable link 50 is reduced in comparison with the pulling amount of the cable 60 after the pivoting angle of the cable link 50 has exceeded a predetermined angle.

When the seat back 2 is thereafter tilted forwardly, or when the back frame 2F is pivoted in the counterclockwise direction about the rotational axis 8R, the sensor pin 54 is released from interference by the guide member 2G and is brought to engage with the engaging recess 45a because the guide member 2G rotates with the back frame 2F. Then, the main link 48 is prevented from rotation and is held in position together with the walk-in stopper pin 52 (see FIG. 12). In other words, the main link 48 is held in position relative to the base member 41 via the sensor link 53. Therefore, in this state, even if the operational force applied to the tilt-down operation lever has been released, the walk-in stopper pin 52 is held to be out of the locus of rotation of the pressing member Pa. In other words, the cancellation of the walk-in position is maintained. In this way, the cable link 50 serves as an input device for changing a walk-in mode to a tilt-down mode.

During the movement of the main link 48 in the counterclockwise direction, the engaging member 48a moves along the elongated slot 49a of the sub-link 49, and therefore, it does not interfere with the sub-link 49. Hence, the movement of the main link 48 does not affect the operation of the slider device 30.

Figure 12:
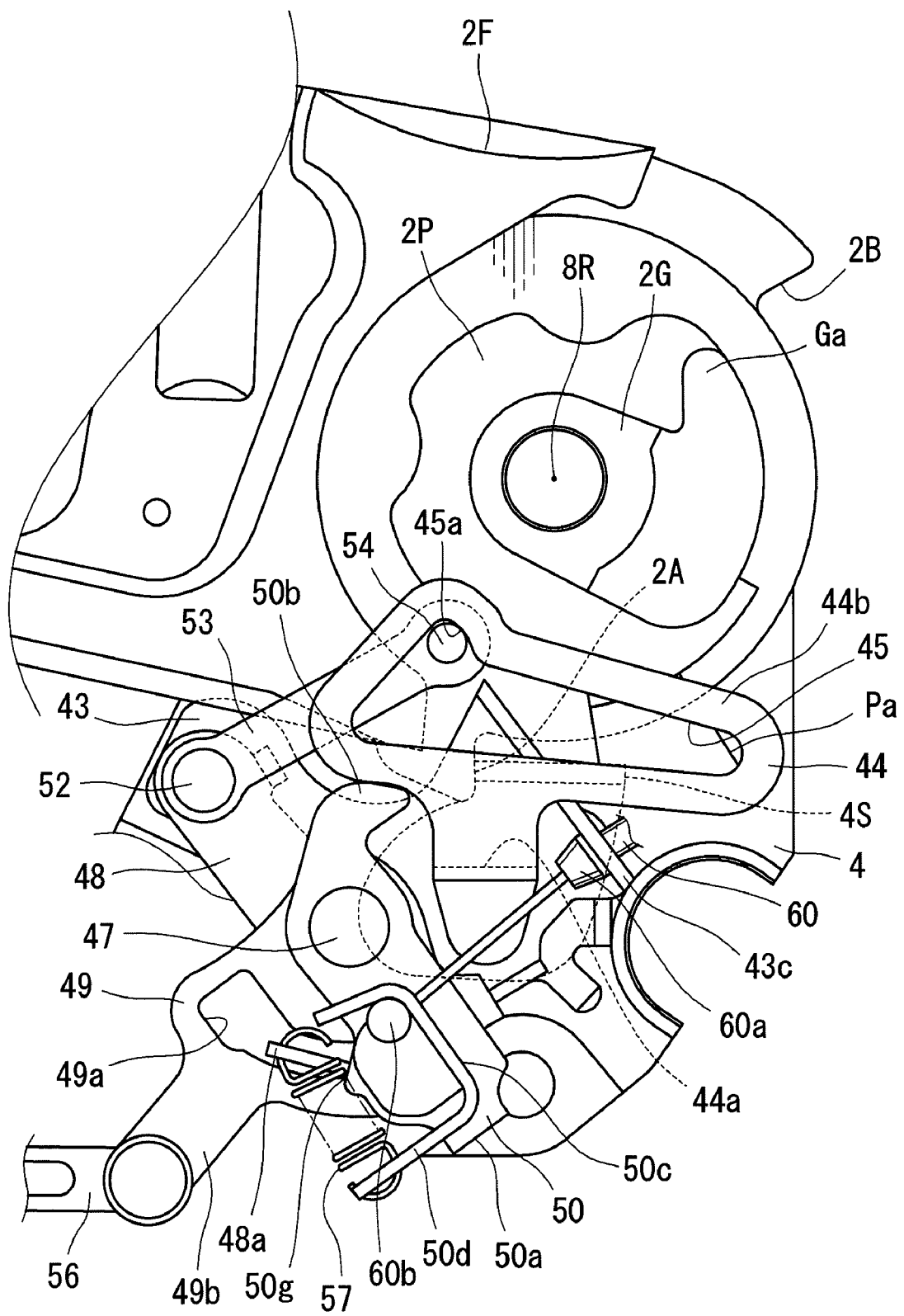
FIG. 12 is a side view of the stopper mechanism when the seat assembly is moved toward the tilt-down position.

As the seat back 2 is tilted further forwardly, or as the back frame 2F is pivoted further in the counterclockwise direction about the central axis 8R, the pressing portion Pa moves rearwardly through a position between the first and second stopper members 42b and 43b without being interfered with the walk-in stopper pin 52 that is positioned out of the locus of movement of the pressing portion Pa. When the stopper 2A is brought to contact with the stopper member 4S as shown in FIG. 12, the back frame 2F is held at a forwardly pivoted position that is taken when the seat assembly 1 is in the tilt-down position.

When the seat assembly 1 returns from the tilt-down position to the seating position, the seat back 2 is raised to pivot rearwardly, or the back frame 2F pivots in the clockwise direction about the central axis 8R. In this case, as the guide member 2G rotates with the back frame 2F, the guide portion Ga pushes the sensor pin 54 out of the fitting position with the engaging recess 45a shown in FIG. 13, so that the sensor pin 54 moves together with the guide portion Ga or is guided by the guide portion Ga. On the other hand, the main link 48 coupled to the cable link 50 via the main sprig 57 returns to the position corresponding to the seating position shown in FIG. 10 by the biasing force of the cable spring 46.

According to the vehicle seat of this embodiment, the rear link 6 that couples the rear portion of the seat cushion 3 and the support base 4 pivots as it receives the transmission of force produced by the forwardly tilting movement of the seat back 2. More specifically, as the seat back 2 tilts forwardly, the rear link 6 pivots in such a direction that the coupling point (connecting rod 6B) between the rear link 6 and the seat cushion 3 shifts downward. Therefore, the seat cushion 3 takes a position in which the rear portion of the seat cushion 3 is shifted downward. Hence, it is possible to prevent or minimize potential interference between the seat back 2 and the seat cushion 3 when the seat back 2 tilts forwardly.

In addition, during the forwardly tilting movement of the seat back 21, the rear link 6 pivots in a direction opposite to the pivoting direction of the front link 5, while the coupling point (connecting rod 6B) shifts downward. Therefore, it is possible to shift the rear portion of the seat cushion 3 downward without accompanying a change of the seat cushion by a large distance in the forward and rearward directions.

Further, in the case that the seat back 2 is tilted for adjustment of the tilt angle within an angular range usable or intended to be used as a backrest, the seat cushion 3 does not move with this movement of the seat back 2 but is held in the seating position. Therefore, it is possible to avoid the lifting movement of the rear portion of the seat cushion 3 during the adjustment of the backrest angle of the seat back 2. For this reason, it is possible to avoid interference between the seat back 2 and the seat cushion 3. In addition, because the seat cushion 3 is held in position, it is possible to adjust the backrest angle of the seat back 2 without affecting to the seating feeling.

Furthermore, because the stopper mechanism shown in FIGS. 9 to 15 can stop the forwardly tilting movement of the seat back 2 at a predetermined tilt position, it is possible to set the position of the seat back 2 to enable the walk-in function of the seat assembly 1. Thus, as the forwardly tilting movement of the seat back 2 is stopped by the stopper mechanism, the slide lock conditions of the sliders 30 are released, so that the entire seat assembly 1 can be slid forwardly with the seat back 2 positioned at the forwardly tilt position in order to broaden the space on the rear side of the seat assembly 1.

On the other hand, by operating the stopper mechanism not to perform the stopping function, the seat back 2 can be tilted largely toward the upper surface of the seat cushion 3, so that it is possible to set the position of the seat back 2 to enable the tilt-down function of the seat assembly 1.

Furthermore, when the stopper mechanism does not perform the stopping function, the seat back 2 can be tilted by a large angle toward an upper surface of the seat cushion 3 that has been shifted downwardly. Therefore, the entire seat assembly 1 can be folded and positioned at a lower level.

The present invention may not be limited to the above embodiment but may be modified in various ways. For example, in the above embodiment, according to the walk-in function, the seat back 2 is tilted to a predetermined forwardly tilted position, where the slide lock of the slider device 30 is automatically released, and thereafter, the seat assembly 1 is moved forwardly by a manual operation. However, the walk-in function is not limited to perform these operations. For example, according to another walk-in function, the seat back is tilted forwardly to a predetermined tilt position corresponding to a walk-in position, the slide lock of the slider device is released by a manual operation, and the seat assembly is moved forwardly by a manual operation. Further, it is possible to automatically slidably move the seat assembly forwardly, for example, by a biasing force of a spring after the slide lock of the slider device has been released.

Further, although the pin Yp provided at the tip end of the transmission plate 2Y is slidably inserted into the elongated slot 6H of the rear link 6 in the above embodiment, the transmission plate 2Y and the rear link 6 can be pivotally coupled to each other via a connecting rod. In this case, however, when the seat back tilts within the adjustable range of the backrest angle, the rear link may pivot to follow the movement of the seat back, so that the position of the seat cushion may be changed.

Further, it may be possible to configure such that the rear link 6 pivots in the same direction as the seat back 2 when the seat back 2 tilts forwardly. In this case, however, the rear link 6 may move away from the seat back 2, and therefore, the length required for the transmitting section may be increased.

This invention claims:

1. A vehicle seat comprising:
   a seat back;
   a seat cushion;
   a support base supporting the seat back on a vehicle floor;
   a front link coupling the support base and the seat cushion to each other and pivotally coupled to each of the support base and the seat cushion; and
   a rear link coupling the seat cushion and the support base to each other and pivotally coupled to each of the seat cushion and the support base,
   wherein the seat back is coupled to the support base, so that the seat back can tilt forwardly relative to the support base, and
   wherein a first coupling point of the rear link to the seat cushion is positioned rearward of a second coupling point of the front link to the seat cushion;
   a force transmission device coupled to the seat back and slidably communicating with the rear link via a cam slot and transmitting a force caused by a tilting movement of the seat back to the rear link when the seat back is tilted forwardly,
   wherein the first coupling point is positioned rearward of a third coupling point of the rear link to the support base, so that the rear link pivots to cause a downwardly shifting movement of the seat cushion as the force is transmitted from the forwardly tilting seat back to the rear link via the force transmission device.

2. The vehicle seat as in claim 1 wherein:
   the rear link pivots relative to the support base in a direction opposite to the tilting direction of the seat back when the seat back is tilted forwardly; and
   the front link pivots relative to the support base in the same direction as the tilting direction of the seat back by receiving the pivoting movement of the rear link.

3. The vehicle seat as in claim 1, wherein:
   the force transmission device is configured such that the force is transmitted from the seat back to the rear link within a first range of a tiltable angle of the seat back and no substantial force is transmitted to the rear link within a second range of the tiltable angle; and
   the seat back is usable as a backrest within the second range of the tiltable angle.

4. The vehicle seat as in claim 1, further comprising a stopper device operable to stop a forwardly pivoting movement of the seat back at a predetermined forwardly pivoted position;
   wherein the seat back can be tilted over an upper surface of the seat cushion when the stopper device is in an inoperative condition.

5. The vehicle seat as in claim 4, wherein:
   when the stopper device is in the inoperative condition, the seat cushion can shift downwardly by the pivotal movement of the front link and the rear link as the seat back tilts forwardly.

6. The vehicle seat as in claim 1, further comprising a slide device disposed between the support base and the vehicle floor for enabling a sliding movement of the vehicle seat in forward and rearward directions;
- wherein the slide device is held in a lock condition to prevent the sliding movement of the vehicle seat; and
- the lock condition is released when a forwardly tilting movement of the seat back is stopped at a predetermined forwardly pivoted position.

7. A vehicle seat comprising:
- a support base;
- a seat back tiltably supported on the support base;
- a seat cushion;
- a first link and a second link each pivotally coupled to the support base and the seat cushion, so that a multi-link mechanism is formed by the support base, the seat cushion, the first link and the second link; and
- a coupling device to comprising a cam slot slidably coupling the seat back to the first link, so that the first link pivots relative to the support base and the seat cushion in response to a tilting movement of the seat back toward the seat cushion,
- wherein the tilting movement of the seat back toward the seat cushion causes the seat cushion to shift toward the support base, while a first coupling point between the first link and the seat cushion and a second coupling point between the second link and the seat cushion move substantially in the same direction relative to the support base,
- wherein the first link and the second link pivot in opposite directions to each other as the seat back pivots,
- wherein the second link pivots in the same direction as the tilting movement of the seat back, and
- wherein the first coupling point is positioned on a lower side of a third coupling point coupling between the first link and the support base.

8. The vehicle seat as in claim 7, wherein the first coupling point is positioned on a rear side of the third coupling point.

9. The vehicle seat as in claim 7, wherein positions of the first and third coupling points vary with a change of a tilt angle of the seat back.

10. The vehicle seat as in claim 7, wherein:
- a tiltable range of the seat back includes a first tiltable range and a second tiltable range; and
- the coupling device is configured such that the first link pivots together with the seat back when the seat back pivots within the first tiltable range, and the first link does not pivot together with the seat back when the seat back pivots within the second tiltable range.

* * * * *